United States Patent
Bertani et al.

(10) Patent No.: US 8,891,404 B2
(45) Date of Patent: Nov. 18, 2014

(54) METHOD AND SYSTEM FOR MANAGING NETWORK DEVICES OF GENERIC VENDORS AND MANUFACTURES

(75) Inventors: Sebastiano Bertani, Milan (IT); Cristian Placente, Catanzaro (IT); Andrea Rincon Ray, San Fermo della Battaglia CO (IT)

(73) Assignee: Tanaza S.r.l., Milan (IT)

( * ) Notice: Subject to any disclaimer, the term of this patent is extended or adjusted under 35 U.S.C. 154(b) by 234 days.

(21) Appl. No.: 13/545,430

(22) Filed: Jul. 10, 2012

(65) Prior Publication Data

US 2013/0016628 A1    Jan. 17, 2013

(30) Foreign Application Priority Data

Jul. 11, 2011    (EP) .................................. 11005641

(51) Int. Cl.
| | |
|---|---|
| H04W 24/00 | (2009.01) |
| H04L 12/24 | (2006.01) |
| H04W 12/06 | (2009.01) |

(52) U.S. Cl.
CPC ............ *H04L 41/046* (2013.01); *H04L 41/0213* (2013.01); *H04W 12/06* (2013.01); *H04L 41/12* (2013.01)
USPC ........................................................ 370/254

(58) Field of Classification Search
CPC ....................................................... H04L 41/12
USPC .................................................. 370/254, 255
See application file for complete search history.

(56) References Cited

U.S. PATENT DOCUMENTS

| | | | |
|---|---|---|---|
| 7,852,819 B2 | 12/2010 | Gil et al. | |
| 2003/0063608 A1* | 4/2003 | Moonen ........................ | 370/390 |
| 2004/0249931 A1 | 12/2004 | Garg et al. | |
| 2005/0114397 A1 | 5/2005 | Doshi et al. | |
| 2008/0189353 A1* | 8/2008 | Gray et al. ..................... | 709/202 |
| 2008/0285575 A1 | 11/2008 | Biswas et al. | |
| 2008/0294759 A1 | 11/2008 | Biswas et al. | |
| 2008/0304427 A1 | 12/2008 | Biswas et al. | |
| 2009/0232025 A1* | 9/2009 | Baggott et al. ................ | 370/254 |
| 2011/0087766 A1 | 4/2011 | Kuo et al. | |

FOREIGN PATENT DOCUMENTS

| | | |
|---|---|---|
| WO | 2004/093384 A1 | 10/2004 |
| WO | WO 2013007344 A1 * | 1/2013 |

OTHER PUBLICATIONS

Universal Plug and Play Vendor's Implementation Guide, Jan. 5, 2001.

* cited by examiner

*Primary Examiner* — Melvin Marcelo
(74) *Attorney, Agent, or Firm* — Husch Blackwell LLP

(57) ABSTRACT

A method of remote management in a network having a plurality of nodes to be managed by a remote controller has an agent device that makes initial contact with the remote controller in order to establish a connection with the remote controller. After the connection is established, the remote controller executes a discovery procedure through intermediation of the agent device for discovering the plurality of nodes. After executing the discovery procedure, the remote controller executes an identification procedure through intermediation of the agent device for identifying the discovered nodes, including identification of at least one characterizing parameter such as model, vendor, manufacturer, software version, hardware version, firmware version, serial number and MAC address. The remote controller manages the discovered and identified nodes through intermediation of the agent device, by using managing procedures specific for the identified nodes.

21 Claims, 15 Drawing Sheets

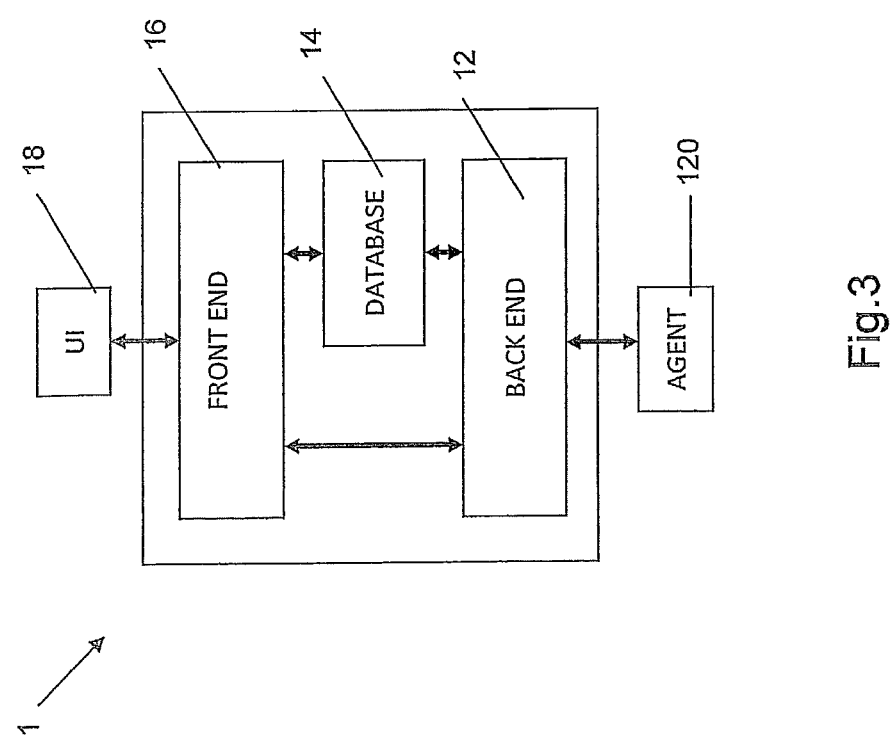

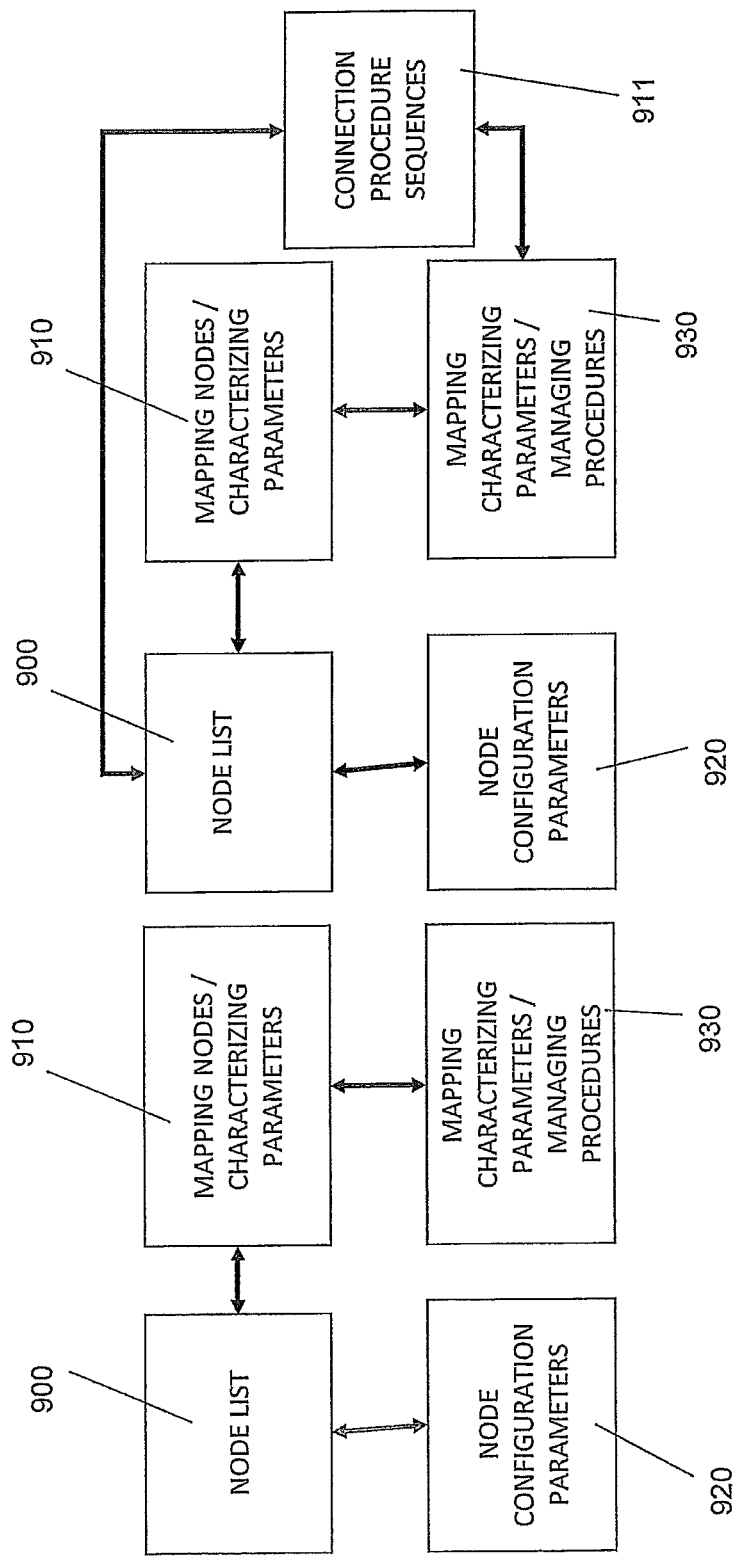

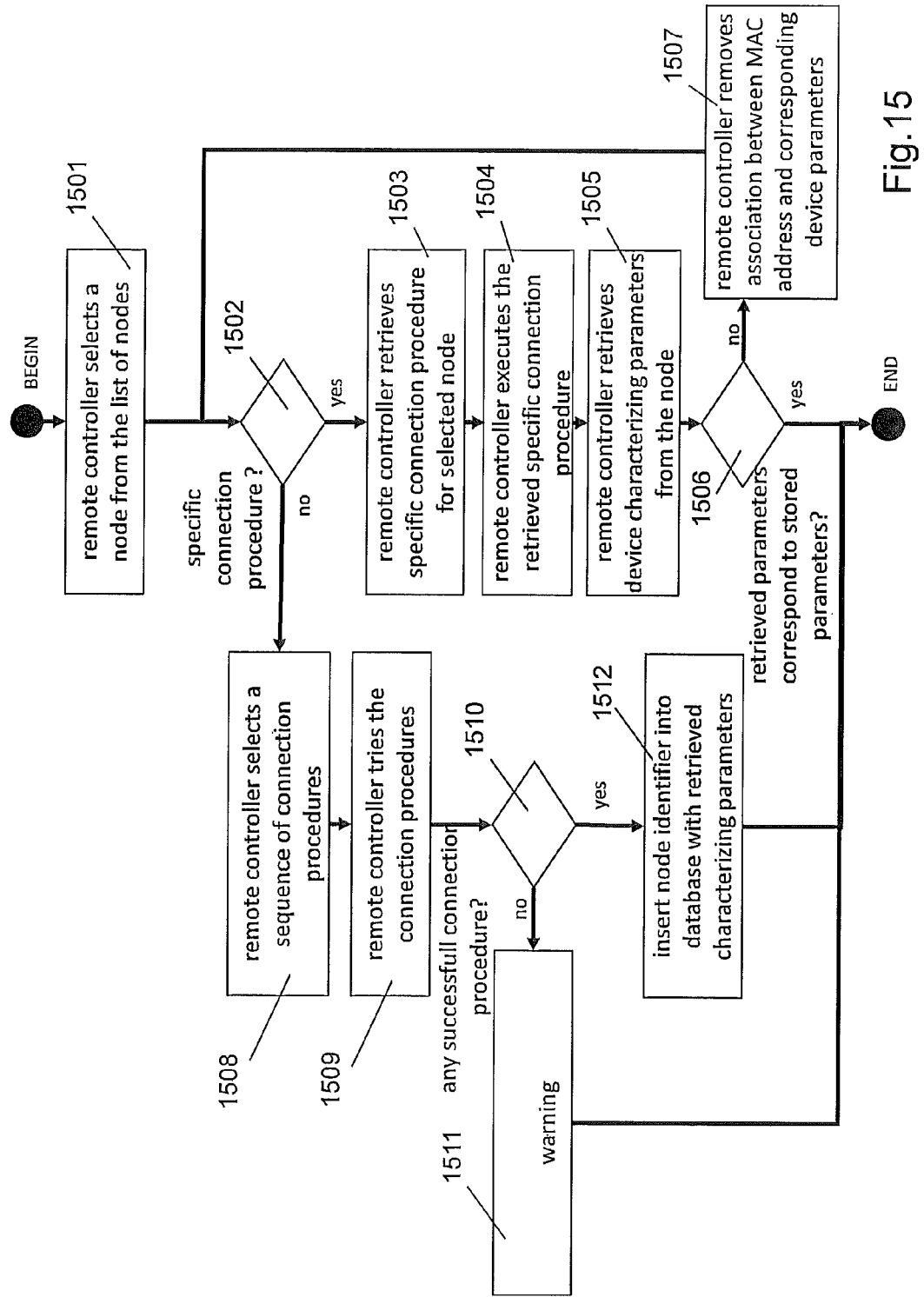

METHOD AND SYSTEM FOR MANAGING NETWORK DEVICES OF GENERIC VENDORS AND MANUFACTURES

CROSS-REFERENCE TO RELATED APPLICATIONS

This application claims priority under 35 U.S.C. §111 to European Application EP11005641.3 filed Jul. 11, 2011.

BACKGROUND

1. Field of the Invention

This invention is in the field of managing networks having a plurality of connected devices from various sources.

2. Prior Art

The present invention relates to a method and system for managing network devices of generic vendors and manufactures.

The pervasive diffusion of access points and other network devices has increased, in the latest years, the costs the companies and individuals have to afford in order to manage, maintain and monitor this multitude of devices Managing multiple network devices such as Wi-Fi Access Points and wireless CPE (Customer Premise Equipment) is a very time consuming task.

The existing methodologies to manage network devices, such as wireless access points, can be classified into three main categories: non-centralized management systems, centralized hardware systems and centralized remote software systems. Each of these classes of solution has some drawbacks as described in the following.

Non-centralized management systems allow network administrators to configure and monitor each network device individually thanks to software, often called firmware, installed and running on the device itself. Different vendors/manufactures implement proprietary protocols on their devices that allow the network administrator to access them in a variety of ways, e.g. web interface, CLI (Command Line Interface) interface, SSH (Secure SHell) protocol.

Non-centralized management systems are usually adopted in consumer-grade routers, gateways and access points, for low-end price-sensitive markets. The drawbacks of this approach are the huge amount of time required to manage each device in a one-by-one fashion; the non-homogeneous user interface provided by each vendor/manufacturer; and the increased probability of human mistake as no centralized consistency check algorithm can be adopted.

Centralized hardware systems are usually designed to provide sophisticated management tools suitable for high-end enterprise markets. These solutions require the installation of a hardware controller, e.g. a server with an installed application, which allows the network administrator to configure all the network devices through one single interface, saving time and reducing managing costs. The drawback of this solution, usually preferred in large plants, airports, harbors, etc., is a higher initial investment, or capex.

Centralized software-based remote systems allow the network administrator to reach and manage network device without the need of purchasing a server or dedicated hardware and of physically installing it. Examples of these systems are described by U.S. Pat. No. 7,852,819, U.S. 2008/0294759, U.S. 2008/0285575, and U.S. 2008/0304427.

Although these systems are attractive both from costs and from time saving standpoint, they also exhibit several limitations and pose challenges as described below.

Network devices usually have to operate according to specific procedures in order to be reached and managed by the network administrator, thus involving the deployment of specific firmware/software on all controllable devices. The solutions disclosed by the above mentioned patent documents imply that manufacturers of enterprise-grade network devices develop proprietary methods and solution for centrally configuring their network devices. This means that in order to be enabled to use a centralized software-based remote system provided by a specific manufacturer, the user is requested to purchase and install in its network only network devices produced by said specific manufacturer. Network devices from generic vendors/manufacturers, such as for example, low-cost consumer-grade network devices, cannot be managed.

An additional drawback is related to the procedures adopted to provide remote access to the network devices which reside within a private network of a user. In the solutions disclosed by the above mentioned patent documents, connection among the host network, i.e. remote controller, and the network devices is initiated and established by each single network device of the managed network. This aspect represents a strong limitation on the scalability of the system.

In order to overcome the above mentioned drawbacks, a centralized software-based remote system that allows managing network devices from various vendors and manufacturers would be advantageous.

U.S. 2011/0087766 discloses a central unified services and device management framework operated to simultaneously manage various types of resources on behalf of multiple organizations.

A drawback of the solution disclosed by U.S. 2011/0087766 is related to the fact that connection among the central management facility and the network devices is initiated and established by each single network device of the managed network. This aspect represents a strong limitation on the scalability of the system. In addition, this solution still requires the deployment of specific firmware/software on all controllable network devices in order to enable them to make initial contact with the central facility, after they have been inserted into the managed network.

This solution still fails to provide an improved centralized software-based remote system that allows managing network devices from generic vendors and manufacturers.

SUMMARY OF THE INVENTION

The invention includes a method of remote management in a network, the network comprising a plurality of nodes to be managed by a remote controller and at least one agent device, the at least one agent device being in number lower than the plurality of nodes, wherein:
- the at least one agent device makes initial contact with the remote controller in order to be authenticated by the remote controller and to establish a connection with the remote controller;
- after the connection is established, the remote controller executes a discovery procedure through intermediation of the at least one agent device for discovering the plurality of nodes;
- after executing the discovery procedure, the remote controller executes an identification procedure through intermediation of the at least one agent device for identifying the discovered nodes, including identification of at least one characterizing parameter selected from:

model, vendor, manufacturer, software version, hardware version, firmware version, serial number and MAC address;

the remote controller manages the discovered and identified nodes through intermediation of the at least one agent device, by using managing procedures specific for the identified nodes.

This method may be established with the remote controller connection being a tunnel connection.

The tunnel connection may be established by the at least one agent device according to a tunnelling procedure including the step of trying in sequence a predetermined plurality of tunnelling protocols for establishing tunnel connection with the remote controller till a tunnel connection is successfully established.

The predetermined plurality of tunneling protocols may be tried in sequence following a selection criterion adapted to minimize resources required on the at least one agent device and/or on the remote controller in order to execute the tunnelling protocols.

The discovery procedure may include trying to establish a connection with the plurality of nodes, through intermediation of the at least one agent device, by using predetermined IP address and/or MAC address, or by using a scanning procedure scanning a predetermined multitude of IP addresses.

The predetermined multitude of IP addresses may comprise IP addresses included in at least one subnet corresponding to at least one interface of the at least one agent device, and/or generic IP addresses corresponding to IP addresses set by default by predetermined manufacturers and/or vendors.

When the at least one agent device comprises more than one interface, the scanning procedure may be executed for each interface.

The identification procedure may comprise:

a) selecting a specific node from the discovered nodes;

b) retrieving from a database of the remote controller a specific connection procedure associated with the specific node;

c) using the retrieved specific connection procedure for connecting to the specific node, through the intermediation of the at least one agent device, and obtaining from the specific node said at least one characterizing parameter.

With this method, when the database does not include a specific connection procedure associated with the specific node, the identification procedure may include trying in sequence a plurality of connection procedures for connecting to the specific node till connection is successfully established, the plurality of connection procedures being selected in sequence according to a predetermined selection criterion.

When a connection to a specific node with a specified IP address and MAC address has to be established, and in case of IP address conflict between the specific node and at least one other node of the plurality of nodes, the at least one agent device may execute an IP conflict avoidance procedure making use of ARP protocol and ARP table, the IP conflict avoidance procedure comprising:

i. sending into the network a request according to ARP protocol in order to translate the specified IP address into a MAC address;

ii. after executing i., checking if the ARP table includes the specified IP address;

iii. in the positive case of ii., checking if the specified IP address is associated in the ARP table with the specified MAC address;

iv. in the positive case of iii., trying to establish a connection with the specific node by using the specified IP address;

v. in the negative case of iii., modifying the ARP table so as to associate the specified IP address with the specified MAC address, then trying to establish a connection with the specific node by using the specified IP address.

When a connection to a specified IP address through a specified interface of the at least one agent device has to be established, and in case of IP address conflict between the specified IP address and the IP address of the specified interface and/or in case the specified IP address is not included in a subnet corresponding to the specified interface, the at least one agent device may execute a subnet conflict avoidance procedure comprising:

I. checking if the specified IP address is included in the subnet corresponding to the specified interface and if the specified IP address is different from the IP address of the specified interface, II. in the affirmative case of I., the at least one agent device tries to establish a connection by using the specified IP address, III. in the negative case of I., the at least one agent devices temporally assigns to the specified interface both a subnet including the specified IP address and an IP address included is said subnet, which is different from the specified IP address.

With this method, when the at least one agent device comprises a plurality of interfaces, step III may also comprise a step of temporarily making out of use any other interface of the plurality of interfaces, other than the specified interface, which corresponds to a subnet including the specified IP address.

The invention may include a remote managing system comprising a remote controller and a network, the network comprising a plurality of nodes to be managed by the remote controller and at least one agent device, the at least one agent device being in number lower than the plurality of nodes, characterized in that the remote controller and the at least one agent device comprise hardware and/or software and/or firmware adapted to carry out any of the methods described herein.

A computer program may be adapted to carry out the steps concerning the remote controller in any of the methods described herein. A computer program may be adapted to carry out the steps concerning the agent device in any of the methods described herein.

In a further aspect, the present invention relates to a computer program product comprising program code means stored on a computer readable medium for carrying out the steps concerning the remote controller in any of the methods described herein.

In a further aspect, the present invention relates to a computer program product comprising program code means stored on a computer readable medium for carrying out the steps concerning the agent device in any of the methods described herein.

In a further aspect, the present invention relates to a remote controller comprising hardware and/or software and/or firmware means adapted to carry out the steps concerning the remote controller in any of the methods described herein.

In a further aspect, the present invention relates to an agent device comprising hardware and/or software and/or firmware means adapted to carry out the steps concerning the agent device in any of the methods described herein.

In the present description and claims, the term:

"network" may indicate any wide or local area network, wired, wireless, hybrid wired/wireless;

"network device" may indicate any device of a network such as a router, a gateway, an access point, a server, a client device (such as a PC, tablet, laptop, mobile phone, and similar);

"node" may indicate a network device to be managed by a remote controller. Examples of nodes are routers, access points, gateways, firewalls, and network hard drives;

"tunnel connection" may indicate a connection established among network devices encapsulating one network protocol, said "payload protocol", inside the messages of another network protocol, said "delivery protocol". This mechanism allows the payload protocol to be delivered even if it is not explicitly allowed by network obstacles such as firewalls, NAT translators, gateways, proxies, etc . . . , which instead, allow the delivery protocol to be delivered;

"tunneling protocol" may indicate a specific protocol adapted to implement a tunnel connection. Each tunneling protocol is able to be delivered across a specific subset of network obstacles.

BRIEF DESCRIPTION OF THE DRAWINGS

Further characteristics and advantages of the present invention will become clearer from the following detailed description of some preferred embodiments thereof, made as an example and not for limiting purposes with reference to the attached drawings. In such drawings, FIG. 1 schematically shows a system according to an embodiment of the invention;

FIG. 3 schematically shows a remote controller according to an embodiment of the invention;

FIGS. 4A and 4B schematically show a remote controller database according to two embodiments of the invention;

FIG. 15 shows a flowchart of an algorithm to implement an identification procedure according to a second embodiment of the invention.

DETAILED DESCRIPTION

Figure 1:
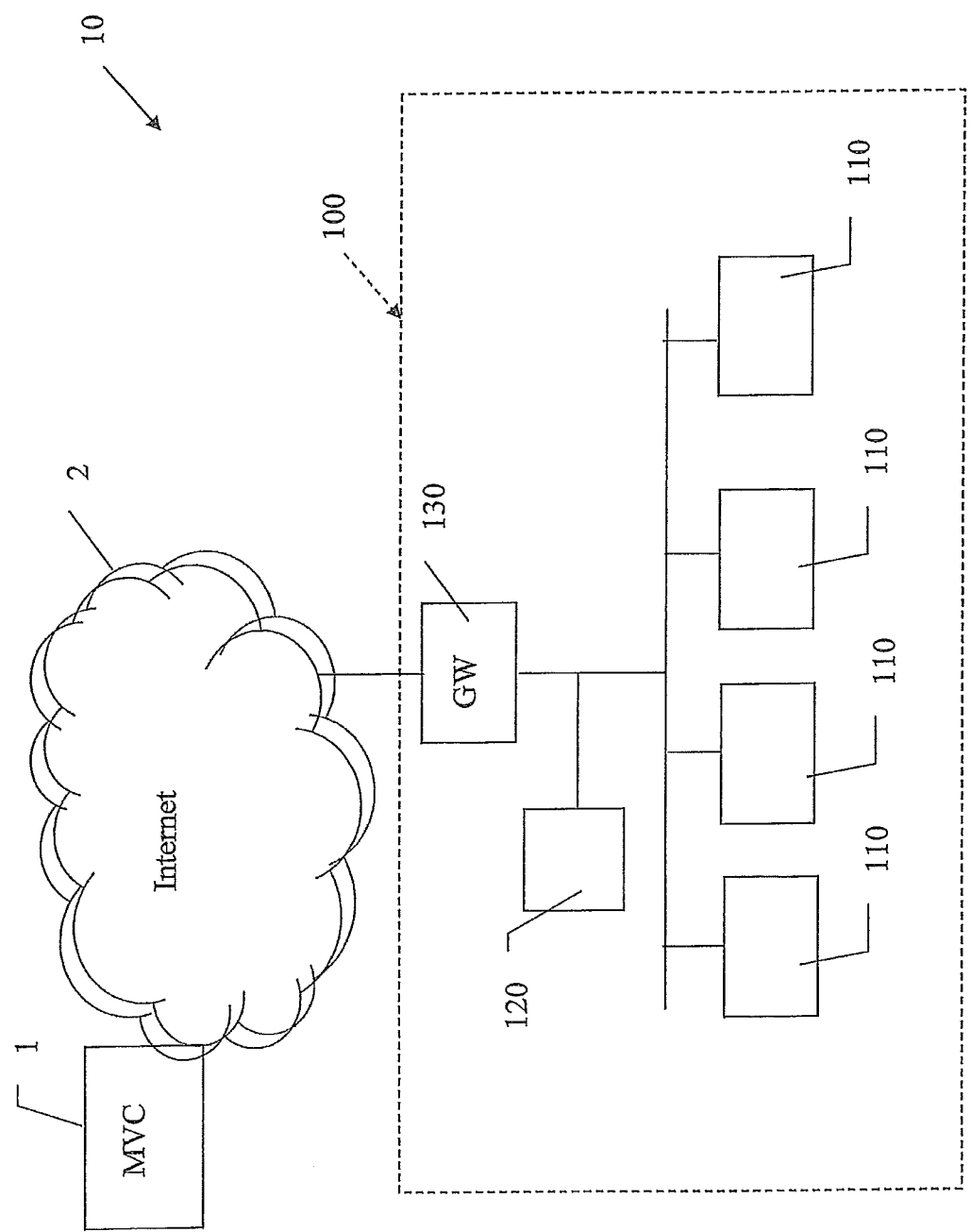

FIG. 1 shows a network device managing system 10 according to an embodiment of the invention, comprising a remote controller 1 (in the present description and drawings referred to also as "multi-vendor controller" or MVC), a wide area network (WAN) 2 and a local area network (LAN) 100. In the exemplary embodiment, the remote controller 1 is located in the WAN 2, the WAN 2 comprises the Internet, and the LAN 100 comprises a plurality of network devices 110, 120 and 130.

In one embodiment of the invention, LAN 100 is an Ethernet/IP (Internet Protocol) LAN. That is, LAN 100 can have any physical layer, and has an Ethernet layer 2 (or data link layer) and an IP layer 3 (or network layer). Preferably, LAN 100 supports translation protocols for resolution of layer 3 addresses (e.g. IP addresses) into layer 2 addresses (e.g. Media Access Control or MAC addresses) and vice-versa. Examples of these protocols respectively are ARP (Address Resolution Protocol) and RARP (Reverse Address Resolution Protocol) well known in the art and specified, for example, by RFC 826 and RFC 903.

Network devices can be wireless or wired routers, access points, gateways, local servers, client devices (such as PC, tablet, laptop, mobile phone, . . . ) and similar.

Network devices to be managed by remote controller 1 are hereinafter referred to as nodes. The nodes can be any network device that might require to be configured or managed such as, for example, access points (AP), routers, gateways, firewalls, network hard drives.

As explained more in detail below, thanks to the invention, the nodes to be managed by remote controller 1 can be of any vendor/manufacturer and can be identified by no specific class or range of (MAC) addresses.

In FIG. 1, LAN 100 comprises a gateway (GW) 130 for connection to the Internet 2, an agent device 120, and four nodes 110 to be managed.

The agent device 120 is an intermediate component of the system 10 that allows the remote controller 1 to communicate with any node of the managed LAN 100.

In particular, the agent device can be any network device of the LAN 100 wherein an agent utility (i.e. computer program) is deployed, which is adapted to carry out the steps of the managing method of the invention relating to the agent device. Advantageously, the network device wherein the agent utility is deployed is a local server of the LAN, which is an always-running device. However, it can also be a client device or a node to be managed, as exemplarily shown in the embodiment of FIG. 2.

The agent utility is a software and/or firmware that can be installed onto a local server of the LAN 100, but can also be represented by a temporary running software on a client device inside the LAN 100, e.g. an active-x or a browser add-on which is active only when the user turns-on a suitable interface of the client device, such as a web-site on his/her laptop, PC, or similar device.

The agent device 120 can comprise one or more interfaces, each covering a subnet of nodes 110 of LAN 100. Each interface is advantageously identified by a specific interface identifier (e.g.: interface 1, interface 2, . . . interface n) and each subnet is identified by an identifier representing a part of IP address (usually the head portion of the IP address) which should be shared among all nodes 110 belonging to the subnet. For example, considering a 32-bit IP address made of 4 sections A.B.C.D, the subnet identifier may represent the initial section(s) A, A.B, or A.B.C. or an intermediate section (e.g. B or B.C).

Figure 2:
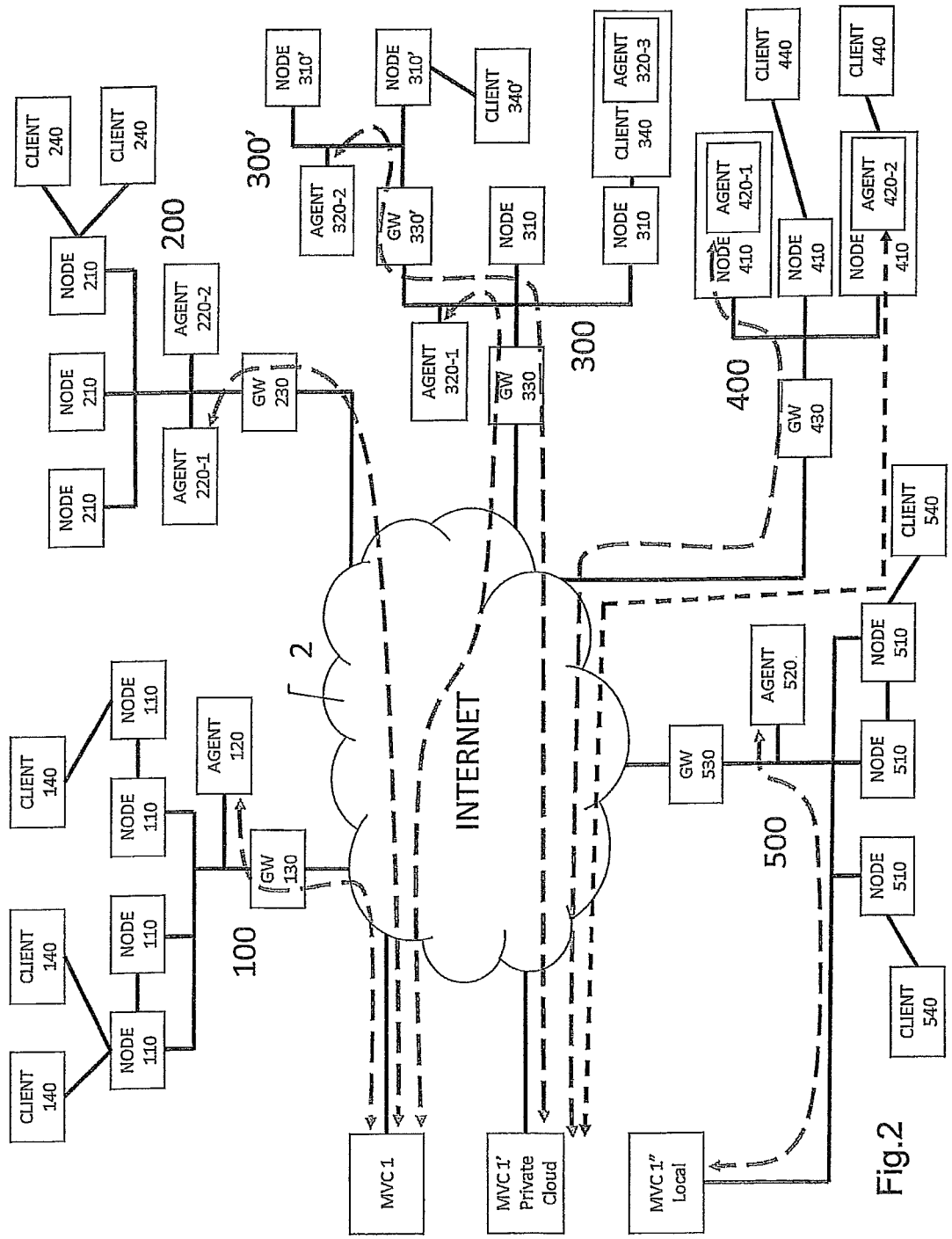
FIG. 2 schematically shows a system according to another embodiment of the invention.

Even if in the embodiment of FIG. 1 the LAN 100 comprises a single agent device 120, each LAN can comprise more than one agent device, as shown in the embodiment of FIG. 2. However, according to the invention, the LAN 100 advantageously has a number of agent devices which is lower than the number of nodes to be managed.

The MVC 1 is the network element through which the user(s) (e.g. network administrator(s)) can reach all the nodes that might be configured, managed or monitored. In the embodiment of FIG. 1, MVC 1 is a centralized server available in Internet. However, the remote controller can also be located in a public cloud, in an intranet, in a private cloud, or even in the LAN for scalability or security reasons.

The term remote controller is used to indicate a centralized remote host or a software/firmware utility (i.e. computer program) deployed on a centralized remote host.

For example, in the embodiment of FIG. 2, the system comprises five LANs 100, 200, 300, 400, 500, the internet 2 and three MVC 1, 1' and 1". MVC 1 is a multi-vendor controller available as a public cloud service, MVC 1' is located in a private cloud, i.e. a de-localized network controlled by a company, and MVC 1" is located inside customer LAN 500, in order to meet specific network security policies specified by the network administrator or by the company.

In the embodiment of FIG. 2, LAN 100 is connected to Internet through gateway 130, comprises a single agent device 120 and a plurality of nodes 110 and client devices 140.

LAN 200 is connected to the Internet through gateway 230 and comprises a plurality of nodes 210 and client devices 240. In order to increase the availability of the management system, LAN 200 comprises two agent devices 220-1 and 220-2 that can be operated alternatively (backup mechanism).

LAN 300 represents a hierarchically organized network comprising a sub-network 300'.

LAN 300 is connected to Internet through gateway 330 while sub-network 300' is hierarchically connected to the Internet through gateway 330' and 330. LAN 300 further comprises a first agent device 320-1, a second agent device 320-2, a third agent device 320-3, a plurality of nodes 310, 310' and client devices 340, 340'. Second agent device 320-2, gateway 330', access points 310' and client devices 340' are part of the sub-network 300'. Third agent device 320-3 is deployed inside a client device 340. This can be implemented in a variety of ways, such as a java applet, an active-x, a browser add-on, an application installed on the client, etc. The common aspect of on-client-deploy of the agent utility is the fact that when the client is turned off, if no other agent device is available for the specific network, then that network would not be manageable; this is not the case of network 300, as first agent device 320-1 would substitute third agent device 320-3 (backup mechanism).

LAN 400 is connected to Internet through gateway 430, comprises two agent devices 420-1, 420-2 and a plurality of nodes 410 and client devices 440. The two agent devices 420-1, 420-2 are implemented in two nodes 410 (i.e., agent utility is deployed on two nodes 410). The two agent devices 420-1, 420-2 allow, individually, to operate on all nodes 410 of LAN 400.

LAN 500 is connected to Internet through gateway 530, comprises a single agent device 520 and a plurality of nodes 510 and client devices 540.

Agent devices are configured to connect to a specific MVC, which can be available in the Internet, in a private cloud, or locally. For example, in FIG. 2, agent devices 120, 220-1, 220-2, and 320-1 are configured to be connected to MVC 1 located in a public cloud service; agent devices 320-2, 420-1 and 420-2 are configured to be connected to MVC 1' located in a private cloud service, and agent device 520 is configured to be connected to MVC 1", locally deployed.

Each remote controller and agent device in the system 10 and LAN(s) (in the following referred to only with the reference numbers 1, 120, and 100, respectively) comprises hardware and/or software and/or firmware modules adapted to implement the corresponding steps of the management method of the invention.

As further explained hereinafter, thanks to the invention, network devices other than agent device and remote controller need no specific adaptation to be made in order to implement the management method. In particular, one innovation of the claimed invention is the fact that it is not required to deploy any specific software onto the nodes to be managed, nor assume any specific procedure or behavior, in order to manage them.

According to the management method of the invention:

the agent device makes initial contact with the remote controller 1 in order to be authenticated and establish a connection with the remote controller 1;

after the connection is established, the remote controller 1 executes a discovery procedure through intermediation of the agent device 120 for discovering nodes 110 of LAN 100 to be managed;

after executing the discovery procedure, the remote controller 1 identifies the discovered nodes 110 through intermediation of the agent device 120;

the remote controller 1 manages the discovered and identified nodes 110 through intermediation of the agent device 120, by using managing procedures specific for the identified nodes 110.

In order to implement the management method of the invention, the remote controller 1 advantageously comprises three logical sub-components, reported in FIG. 3: a database 14; a back-end 12; and a front-end 16.

A user, herein after referred to as network administrator, can interact with the remote controller 1 in order to access, configure, control and monitor the nodes 110 through at least one user interface UI 18. User interfaces 18 can be command line interfaces, desktop applications, web applications, mobile devices applications such as iPad, iPhone or Android applications, widgets, and similar. The at least one user interface UI 18 is adapted to exchange information with the front-end 16.

The front-end 16 allows, through user interface UI 18, the network administrator to choose which nodes 110 to access, configure, control and monitor.

The database 14 advantageously includes a list of nodes 110 to be managed. This list can be created by the network administrator or can be automatically generated by the remote controller 1 and, optionally, confirmed by the network administrator. The database 14 advantageously also include a set of protocols and procedures required to access, configure, control and monitor nodes manufactured by different manufacturers/vendors, each of them characterized by specific device characterizing parameters, such as, for example, model, vendor, manufacturer, software version, hardware version, firmware version, serial number and/or MAC address.

The back-end 12 is the sub-component of the remote controller 1 that allows to establish communication between the remote controller 1 and the agent device 120.

The database 12, back-end 14, and front-end 16 can be physically deployed on a same server, as reported in FIG. 3, or on different servers or virtual servers or clouds, private or public.

FIG. 4A shows an embodiment of structure for database 14 comprising: a first section 900 containing a list of nodes, identified, for example, by IP (Internet Protocol) and/or MAC (Media Access Control) addresses; a second section 910 wherein the nodes of the list (identified by their IP and/or MAC (Media Access Control) addresses) are associated with specific device characterizing parameters such as model, vendor, manufacturer, software version, hardware version, firmware version and/or serial number; a third section 920 wherein the nodes of the list are associated with specific configuration parameters that can be specified by the network administrator; and a fourth section 930 comprising a plurality of managing procedures, each associated with specific device characterizing parameters such as, for example, model, vendor, manufacturer, software version, hardware version, firmware version and/or serial number.

The structure of FIG. 4B is similar to FIG. 4A except for the fact the it further comprises a fifth section 911 comprising a list of sequences of connection procedures, as explained further in detail herein after, when dealing with nodes identification procedure of FIG. 15.

Figure 5B:
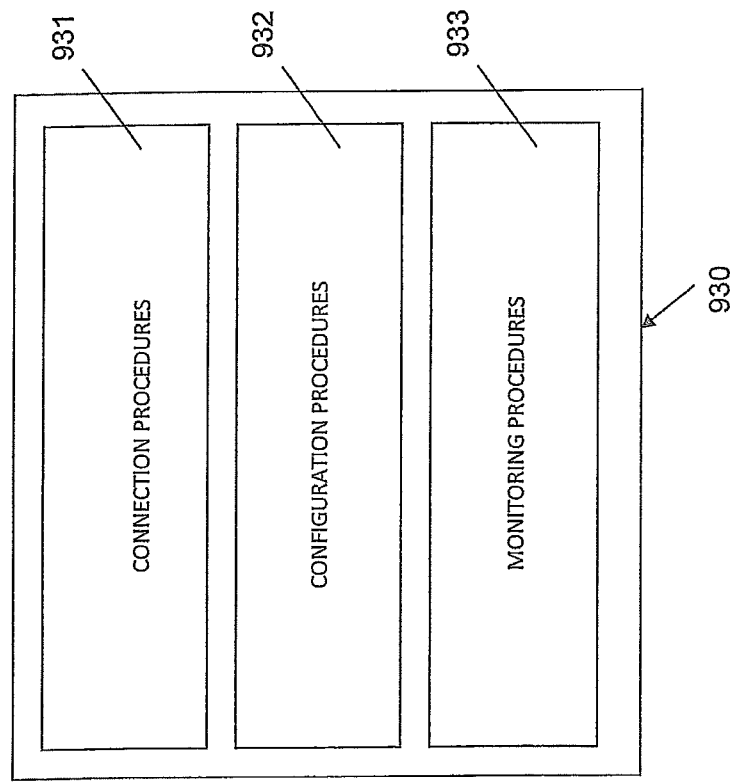
FIGS. 5A and 5B schematically show the structure of a section of the remote controller database according to two embodiments of the invention.
Figure 5A:
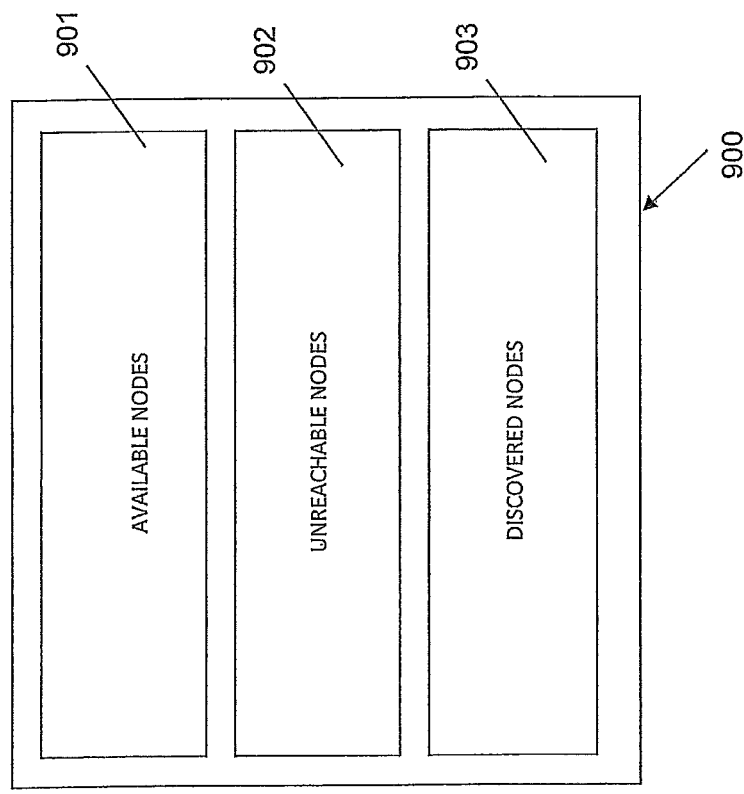

As shown in FIG. 5A, in first section 900 nodes can be classified in "available nodes" 901, "unreachable nodes" 902, and "discovered nodes" 903.

As shown in FIG. 5B, in fourth section 930 the managing procedures can be classified in connection procedures 931, configuration/control procedures 932 and monitoring procedures 933. The managing procedures can be implemented according to protocols and/or mechanisms supported by proprietary interfaces of nodes 110 to be managed. Examples of such protocols and mechanisms well known in the art are the following: CLI (Command Line Interface), SSH (Secure SHell, as for example defined by RFC4251), Telnet protocol, HTTP (Hyper Text Transfer Protocol, as for example defined by RFC2616), HTTPS (Hyper Text Transfer Protocol over Secure Socket Layer, as for example defined by RFC2818), SMTP (Simple Network Management Protocol, as for example defined by RFC1157), OPC (Open Connectivity as described for example at the web site opcfoundation.org) protocol, SCADA (Supervisory Control And Data Acquisition) architecture, mechanism to download configuration file(s) from a node and to upload into the node new configuration file(s) with modified parameters, such as FTP (File Transfer Protocol, as for example defined by RFC959), TFTP (Trivial File Transfer Protocol, as for example defined by RFC1350), SCP (Secure Copy Protocol); mechanism that mocks the navigation of a virtual user through the web-based interface of a node, emulating navigation commands, such as HTTP-based queries, HTTPS-based queries, AJAX (Asynchronous JavaScript and XML) interactions.

Figure 6:
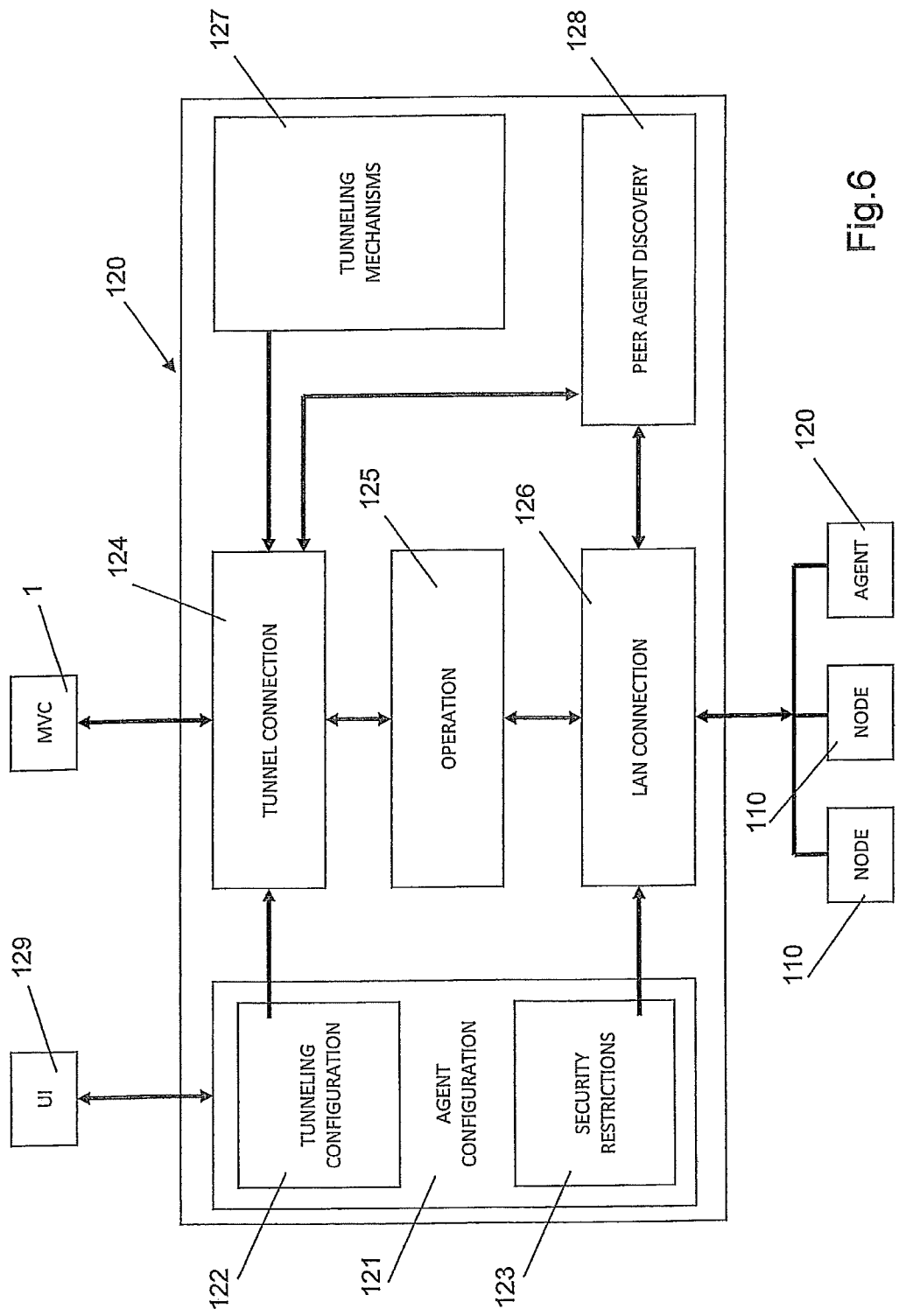
FIG. 6 schematically shows an agent device according to an embodiment of the invention.

In order to implement the managing method of the invention, the agent device 120 advantageously comprises a user interface 129, an agent configuration section 121, a tunneling connection section 124, an operation section 125, a LAN connection section 126, a tunneling mechanism section 127, a peer agent discovery section 128, as shown in FIG. 6.

The agent configuration section 121, in its turn, comprises a tunneling configuration section 122 and a security restrictions section 123.

The tunneling configuration section 122 advantageously comprises parameters required by specific tunneling mechanisms (such as, for example, MVC address, proxy authentication parameters, etc.) or administrative exclusion of specific tunneling mechanisms (e.g. for security reasons).

The security restrictions section 123 allows the user to deny access to specific nodes 110 and to be compliant with strict security policies. If these restrictions are specified, both agent device 120 and remote controller 1 will not be able to reach the restricted nodes 110.

The tunnel connection section 124 is adapted, in cooperation with tunneling mechanism section 127, to establish a tunnel connection with a specified remote controller 1 by taking the appropriate actions to overcome a variety of network obstacles that can prevent the agent device 120 to successfully connect to the remote controller 1, as explained in more detail herein after with reference to FIG. 7. Said obstacles can include NAT translators, firewalls, proxies, traffic-shapers and similar.

The operation section 125 is adapted to enable execution of operations, such as managing procedures (that can be classified in connection procedures 931, configuration/control procedures 932 and monitoring procedures 933) requested by the remote controller 1 for a specific node 110, and steps of tunneling procedure, discovery procedure, identification procedure, IP conflict avoidance procedure, subnet conflict avoidance procedure, described in detail herein after.

The LAN connection section 126 is adapted to establish LAN connections with the nodes 110 according to techniques known in the art, such as for example Ethernet (IEEE 802.3), Wi-Fi (IEEE 802.11), Fiber Optic or other network standards.

The tunneling mechanism section 127 is adapted to execute a tunnelling procedure, as explained in more detail herein after with reference to FIG. 7.

The peer agent discovery section 128 is adapted to implement a peer discovery procedure in order to discover any other agent device that may be present in the LAN. This procedure is described in more detail below, with reference to FIG. 7.

The user interface 129 enables the user (e.g., the network administrator) to directly interact with the agent device 120.

An advantage of the invention is that a tunnel connection does not need to be maintained between the remote controller 1 and each individual node 110 of the LAN 100, as the tunnel connection is established only with the single agent device 120 (or with a number of agent devices lower than the total number of nodes 110 of the LAN).

This aspect is advantageous, compared to other solutions, for at least the following reasons:

it allows to reduce the resources required at the remote controller 1, as the number of connections is diminished by a factor K, equal to the average number of nodes 110 for agent device 120;

it allows to reduce the resources required at the managed nodes 110, as it is not required any permanent connection between the nodes 110 and the remote controller 1;

it reduces the bandwidth occupation, as the agent device 120 can adopt a variety of well-known traffic compression and aggregation techniques that allow a reduction of the traffic both in terms of number of packets per second and of bytes per second. The number of packets per second is reduced from $K*fs$, in non-agent-device based solution, (where K is the number of average nodes 110 per agent device 120 and fs is the frequency with which an information is sent) to $1*fs$ in the solution of the invention, thus reducing the number of packets of a factor K and saving processing power at each node 110. On the other hand, the traffic expressed in terms of bytes per second is reduced from K*fs*D (where D is the average packet size in non-agent-device based solutions) or K*fs*D' (where D'<D is the average packet size in non-agent-device solutions implementing a local compression at the nodes 110) to 1*fs*(K*D"), where K*D" is the average size of the packet that is sent by the agent device 120 and includes all the information of the K nodes 110. This packet has an average size K*D"<K*D'<K*D thanks to the compression provided by well-known techniques that cannot be adopted in non-agent-device based solutions. In fact, these techniques leverage the mutual information, or correlation, among packets in order to reach higher compression ratios.

In order to connect to the remote controller 1, the agent device 120 establishes a tunnel connection using a variety of techniques to overcome the aforementioned network obstacles that include, but are not limited to, NAT translators, UDP blocks, firewalls, gateways, traffic shapers, http proxies, https proxies, socks proxies, and so on.

Tunneling techniques, e.g. UDP tunnel, known in the art are able to pass only a subset of said network obstacles (e.g. NAT translators). This requires the network administrator to modify the security policies of the LAN in order to guarantee the proper communication with the remote controller 1. Unfortunately, especially in large enterprises and corporations, it is not always possible to modify such policies.

The tunneling procedure proposed by the invention aims at guaranteeing a tunnel connection irrespectively of any security policies configured in the LAN 100, without requiring any change of such security policies.

This is obtained thanks to a procedure wherein the agent device 120 tries in sequence a plurality of tunnelling protocols for establishing a tunnel connection with the remote controller 1, till a tunnel connection is successfully established.

The plurality of tunnelling protocols tried by the agent device 120 can be the following protocols known in the art: ip-over-ip tunneling; ip-over-udp tunneling; ip-over-tcp tunneling; ip-over-http tunneling; ip-over-http tunneling through proxy (http, https, socks, etc.); http tunneling through proxy and traffic shaper.

Figure 7:
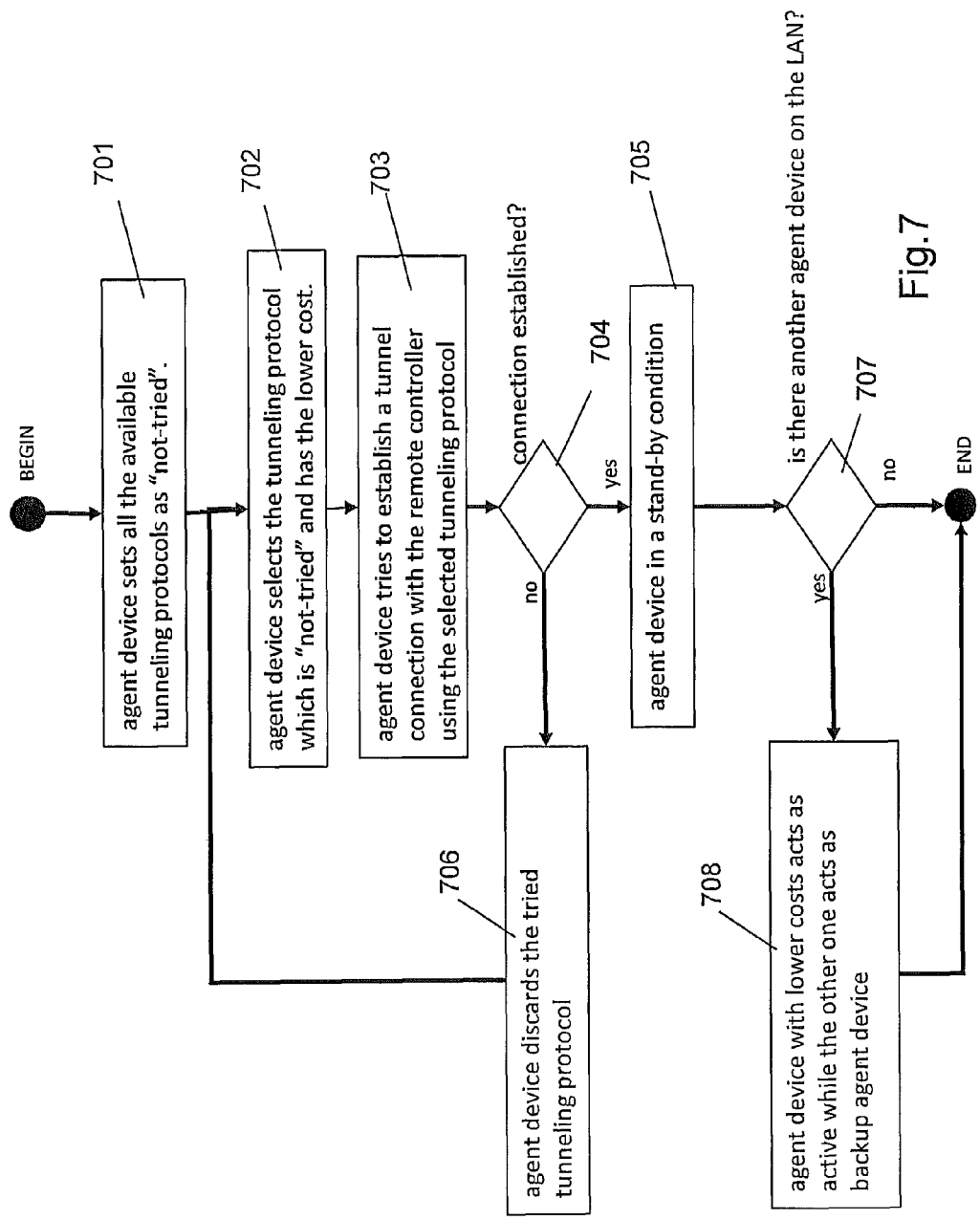
FIG. 7 shows a flowchart of an algorithm to implement a tunneling procedure according to an embodiment of the invention.

FIG. 7 shows an exemplary embodiment of algorithm to implement the tunneling procedure according to the invention.

At block 701, the agent device 120 sets all the available tunneling protocols as "not-tried". Non configured protocols, i.e. the ones that require some configuration parameter to be specified by the network administrator (e.g. proxy address in case of http tunneling through proxy) are discarded. In addition, the network administrator could decide to exclude specific protocols from the list, in order to be compliant with predetermined security rules or policies. In this case, excluded protocols will not be tried.

At block 702, the agent device 120 selects the protocol having the lower cost among the ones labeled as "not-tried". As each protocol is able to pass different kind of network obstacles and has a specific cost in term of required resources both on the agent device and on the server or cloud platform where the remote controller 1 is executed, the cost can represent the required resources at the agent device 120 and/or remote controller 1. The required resources can include computational power, network bandwidth, power consumption, memory usage or any other aspect that can be relevant for the specific network.

The cost associated to each protocol can be assigned in a variety of ways. For example, it can be an arbitrary integer number (1: ip packets, 10: udp tunnel, 100: tcp tunnel, 1000: http tunnel, . . . ).

At block 703 the agent device tries to establish a tunnel connection with the remote controller 1 using the selected tunneling protocol.

At block 704, the agent device 120 checks if the connection is established.

In the positive case, at block 705 the agent device 120 stays in a stand-by condition, waiting for instructions from the remote controller 1 or nodes 110.

In the negative case, at block 706 the agent device 120 discards the tried protocol and returns to block 702 to try another—not yet tried—tunneling protocol at a higher cost. In the worst-case scenario, the selected protocol will be the one with the highest cost (this assuming that there is at least one protocol enabling the agent device 120 to access the external network (e.g. the Internet).

In a preferred embodiment, the algorithm also comprises blocks 707 and 708. At block 707, once connected, the agent device 120 checks if there is any other agent device on the same LAN 100. In the negative case, the algorithm ends. In the positive case, at block 708 agent device 120 chooses to act as active agent or backup agent device based on a cost comparison: the agent device with the lower cost acts as active while the other one acts as backup agent device. One example of metric for cost comparison is the time availability of the agent device: this metric would allow the system to use agent devices that are resident on a local server and consider client activex or similar agents as backup.

Two exemplary strategies to allow the agent device 120 to discover the existence of concurrent agent devices on the same LAN are the following: centralized and peer-based. In the centralized strategy, the remote controller 1 compares the list of nodes 110, e.g. the MAC address, associated to each agent device 120; if two agent devices are associated to the same list of nodes 110, they are considered concurrent and the remote controller 1 decides which agent device 120 must act as backup. In the peer-based strategy each agent device 120 sends broadcast packets to establish a connection to other peer-agent devices 120 on the same LAN 100; these packets contain information about actual connectivity to remote controller 1 and cost; each agent device 120 can individually decide to act as backup or active agent for the LAN 100. Both of these solutions have strengths and weaknesses: the centralized approach simplifies the agent device structure and makes no assumption on agent intra-LAN connectivity but requires higher resources on the remote controller 1; the peer-based approach reduces the resources used by the remote controller 1, but requires a higher complexity on the agent devices 120.

As stated above, after the agent device 120 establishes a tunnel connection with remote controller 1, the remote controller 1 executes a discovery procedure through intermediation of the agent device 120 for discovering the nodes 110 of LAN 100.

The discovery procedure includes trying to establish a connection with nodes 110, through intermediation of the agent device 120, by using predetermined IP address and/or MAC address, or by using an automatic scanning procedure (not requiring any information from the network administrator) that scans a predetermined multitude of IP addresses for trying to establish a connection with the nodes 110.

Figure 8:
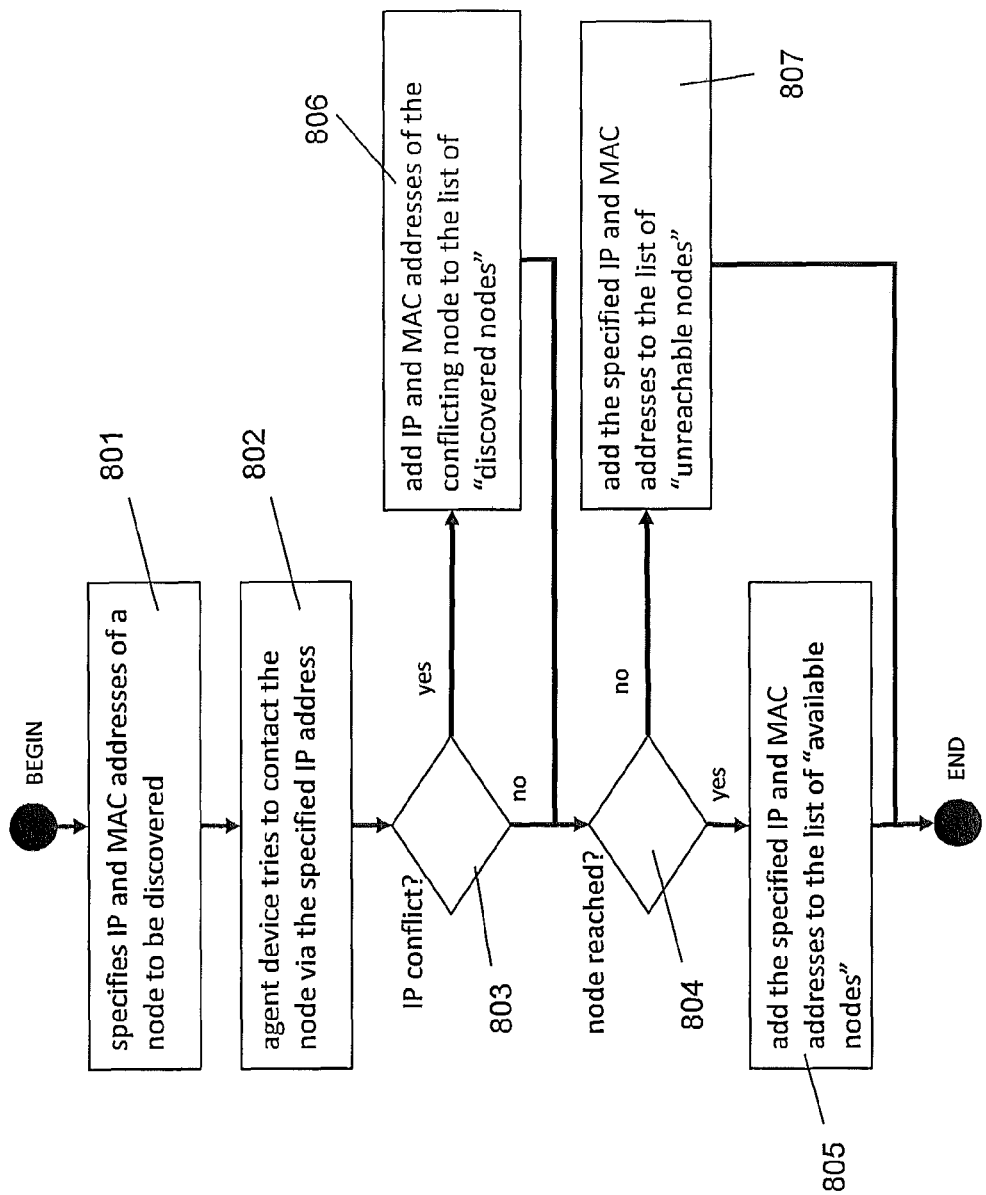
FIG. 8 shows a flowchart of an algorithm to implement a discovery procedure according to a first embodiment of the invention.

FIG. 8 shows a first embodiment of a discovery procedure, making use of both IP and MAC addresses.

At block 801 network administrator specifies to the remote controller 1 the IP and MAC addresses of a specific node 110 to be discovered.

In this embodiment and in the other embodiments of FIGS. 9, 10, 11, 14 and 15 herein after described, any time there is more than one agent device 120, network administrator can select which is the preferred agent device to be used or can leave this choice to the remote controller 1. In the latter case the remote controller 1 can, for example, select the agent device that minimizes or maximizes some metric related to the node 110 and the agent device 120 itself (e.g. maximize availability of the connection between agent device 120 and node 110, minimize the difference between the agent device interface IP address and the node IP address, minimize the time of latest connection between agent device 120 and node 110). The remote controller 1 can also select more than one agent device 120 and execute the following steps for each selected agent device in parallel or in sequence: this possibility allows to reach nodes 110 connected only to an agent device, hiding to the network administrator the complexity of agent device selection.

At block 802 the remote controller 1 instructs the agent device 120 to contact the specific node 110 at the specified IP address. If required (that is if a node is reached that has a MAC address different from the specified MAC address), the agent device 120 (automatically or under the control of the remote controller 1) invokes an IP conflict avoidance procedure, as described in further detail below with reference to FIG. 12.

If required, (that is if the specified IP address is not included in any subnet IP identifier of the interfaces of agent device 120 and/or if the specified IP address corresponds to the IP address of the agent device interface), at block 802 the agent device 120 (automatically or under the control of the remote controller 1) can also invoke a subnet conflict avoidance mechanism, as described in further detail below with reference to FIG. 13.

At block 803 the remote controller 1 (or agent device 120) checks if a node having an IP conflict with the specific node 110 has been discovered during any execution of the IP conflict avoidance procedure.

In the positive case, at block 806 the remote controller 1 adds the IP and MAC addresses of the conflicting node in the first section 900 of database 14 in the list of "discovered nodes".

Anyhow, at block 804 the remote controller 1 (or agent device 120) checks if the specific node 110 with the specified IP and MAC address has been reached.

In the negative case, at block 807 the remote controller 1 adds the specified IP and MAC addresses in the first section 900 of database 14 in the list of "unreachable nodes".

In the positive case, at block 805 the remote controller 1 adds the specified IP and MAC addresses in the first section 900 of database 14 in the list of "available nodes".

Figure 9:
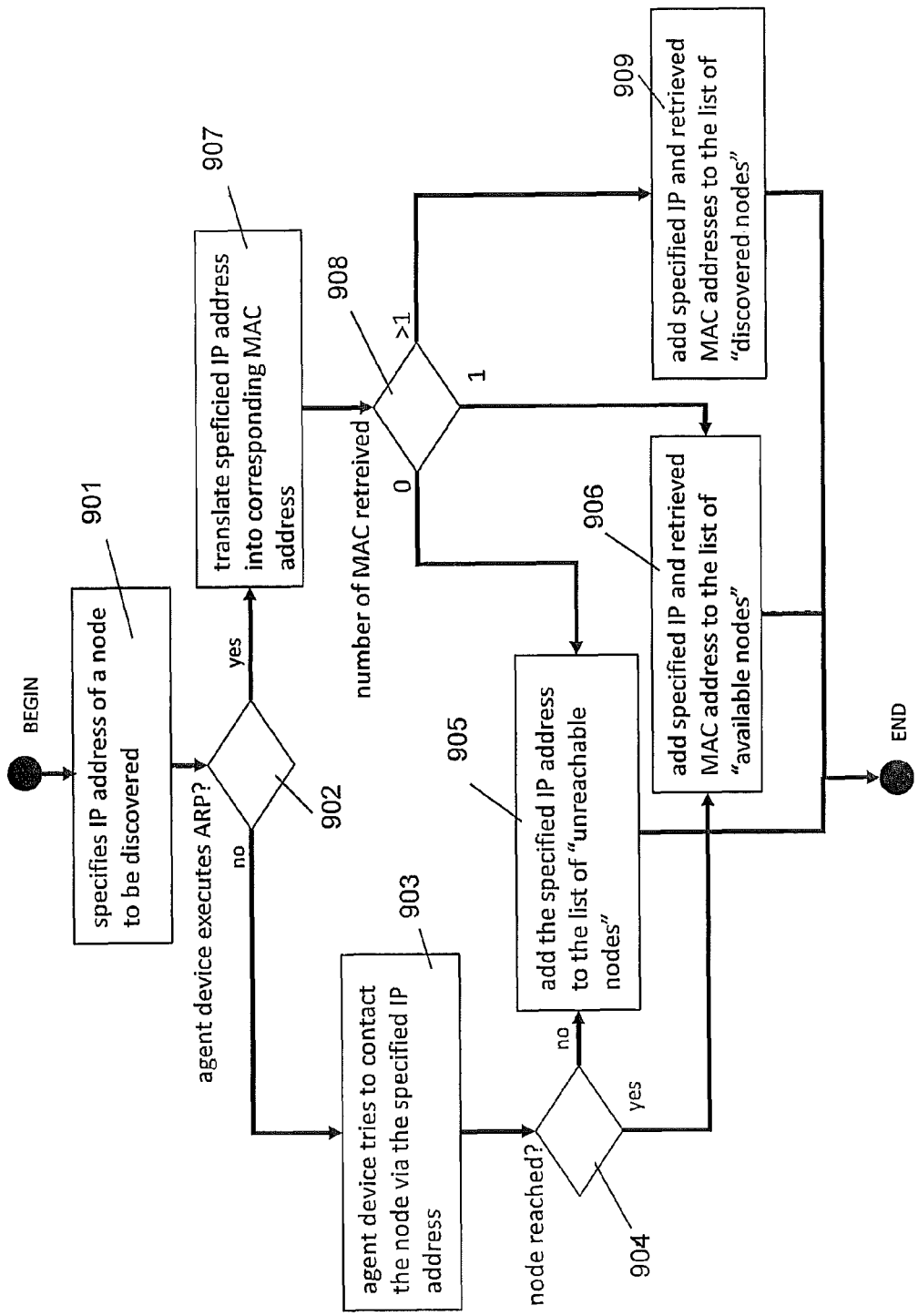
FIG. 9 shows a flowchart of an algorithm to implement a discovery procedure according to a second embodiment of the invention.

FIG. 9 shows a second embodiment of a discovery procedure, making use of only IP addresses.

At block 901 network administrator specifies to the remote controller 1 only the IP address of a specific node 110 to be discovered.

The next step depends on capabilities of the agent device 120.

At check 902, it is checked (by the remote controller or agent device 120) if the agent device 120 supports a translation protocol for resolution of IP addresses into MAC addresses, as for example the ARP.

In the negative case, at block 903 agent device 120 tries to contact the specific node by using the specified IP address.

At block 904, the remote controller 1 (or agent device 120) checks if a node 110 with the specified IP address has been reached.

In the negative case, at block 905 the remote controller 1 adds the specified IP address in the first section 900 of database 14 in the list of "unreachable nodes" and the procedure ends.

In the positive case, at block 906 the remote controller 1 adds the specified IP address and the MAC address, as retrieved during connection with the node 110, in the first section 900 of database 14 in the list of "available nodes".

When the check at block 902 is positive (that is the agent device 120 supports a translation protocol), at block 907 the agent device 120 sends a suitable request (e.g. ARP request) to the LAN 100 in order to translate the specified IP address into a corresponding MAC address, according to the translation protocol.

At block 908 the remote controller 1 checks if any MAC address has been received as answer to the request.

If no MAC address is received, at block 905 the remote controller 1 adds the specified IP address in the first section 900 of database 14 in the list of "unreachable nodes" and the procedure ends.

If only one MAC address is received, at block 906 the remote controller 1 adds the specified IP address and the received MAC addresses in the first section 900 of database 14 in the list of "available nodes".

If more than one MAC address is received, at block 909 the remote controller 1 adds the specified IP address with associated the plurality of received MAC addresses in the first section 900 of database 14 in the list of "discovered nodes". In this case, the remote controller 1 (automatically or under the control of the network administrator) will have to solve the IP conflict, as explained for example hereinafter.

Figure 10:
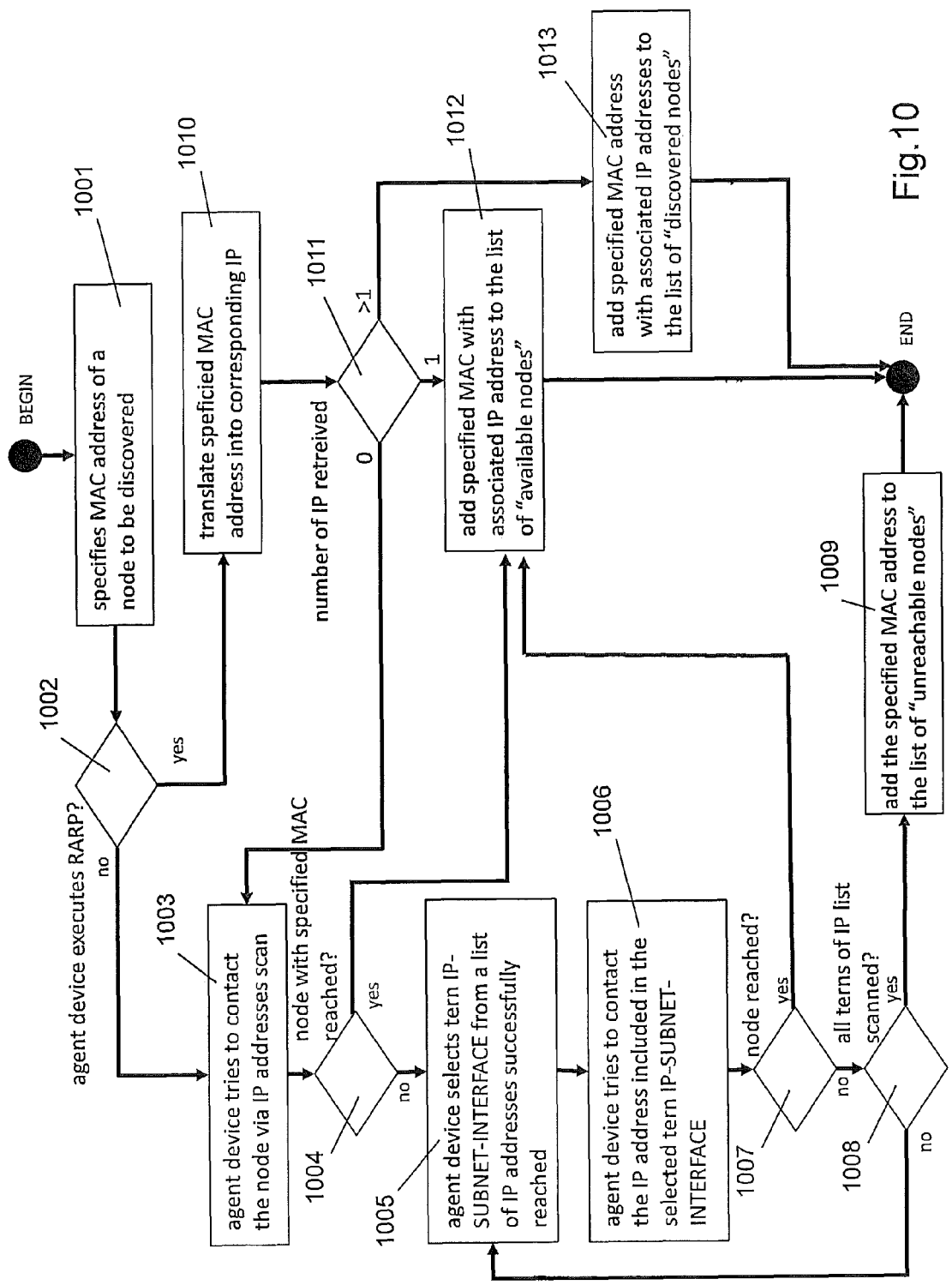
FIG. 10 shows a flowchart of an algorithm to implement a discovery procedure according to a third embodiment of the invention.

FIG. 10 shows a third embodiment of a discovery procedure, making use of only MAC addresses of nodes 110 to be discovered.

At block 1001 network administrator specifies to the remote controller 1 only the MAC address of a specific node 110 to be discovered.

The next step depends on capabilities of the agent device 120.

At check 1002, it is checked (by the remote controller or agent device 120) if the agent device 120 supports a translation protocol for resolution of MAC addresses into IP addresses, as for example the RARP.

In the negative case, at block 1003 the agent device 120 (automatically or under the control of remote controller 1) tries to reach the specific node by making a first scan of IP addresses. The scan can be made by applying the procedure described below with reference to FIG. 11 and stopping it when a node with the specified MAC address is reached.

At block 1004, the remote controller 1 checks if the specific node with the specified MAC address has been found during the first scan.

In the positive case, at block 1012 the remote controller 1 adds the specified MAC address with the associated IP address into the list of "available nodes" of the first section 900 of database 14 and the procedure ends.

In the negative case, before considering the node as unreachable, at blocks 1005 and 1006, the agent device 120 (automatically or under the control of remote controller 1) preferably executes a second scan trying to reach all IP addresses successfully reached by the agent device 120, during the first scan of block 1003.

These IP addresses are contained in an IP-list created by the agent device 120 during the first scan, including the tern IP-SUBNET-INTERFACE (i.e., IP address, subnet identifier and interface identifier) indicating, for each IP address reached by agent device 120 during the first scan, the identifier of the subnet and the identifier of the agent device interface at which the IP address has been reached.

At block 1005 the agent device 120 (automatically or under the control of remote controller 1) selects one tern IP-SUBNET-INTERFACE from said IP-list.

At block 1006 the agent device 120 (automatically or under the control of remote controller 1) tries to contact the IP address included in the tern selected at block 1005 through the interface included in said tern by invoking, if required, the subnet conflict avoidance procedure and, optionally, the IP conflict avoidance procedure, according to the procedures detailed hereinafter.

The second scan performed at blocks 1005 and 1006 is useful for reaching a node identified by the specific MAC address that might be hidden by an IP address contained in the IP-list, due to an IP conflict.

At block 1007, the remote controller 1 (or agent device 120) checks if a node has been reached.

In the positive case, at block 1012 the remote controller 1 adds the specified MAC address with the corresponding IP address in the first section 900 of database 14 in the list of "available nodes" and the procedure ends.

In the negative case, at block 1008 the remote controller 1 (or agent device 120) checks if all IP-SUBNET-INTERFACE terns from said IP-list have been scanned.

In the negative case, the procedure returns at block 1005.

In the positive case (that is, when no device with an IP address included in the IP-list and the specified MAC address has been reached), at block 1009 the remote controller 1 adds the specified MAC address in the first section 900 of database 14 into the "unreachable nodes" list.

In the positive case of block 1002 (that is, when the agent device supports a translation protocol for resolution of MAC addresses into IP addresses), at block 1010 the remote controller 1 sends, through the agent device 120, a request (e.g. RARP request) into the LAN 100 in order to translate the specified MAC address into a corresponding IP address.

At block 1011 the remote controller 1 checks if any IP address has been received as answer to the sent request.

If no IP address is received, the procedure continues at block 1003.

If only one IP address is received, at block 1012 the remote controller 1 adds the specified MAC address with the received IP address in the first section 900 of database 14 in the list of "available nodes".

If more than one IP address is received (e.g., when there are aliases on an interface of a node 110 so that there is more than one IP address associated with such interface or there is a MAC conflict case), at block 1013 the remote controller 1 adds the specified MAC address with associated the plurality of received IP addresses in the first section 900 of database 14 in the list of "discovered nodes". Then, the remote controller 1 (automatically or under the control of the network administrator) can, for example, decide to use indiscriminately any of the IP addresses any time it needs to reach the node or to choose a specific one to use.

Advantageously, according to the invention, a scan based discovery procedure is also contemplated, which can be implemented automatically by the remote controller 1 without requiring any information from the network administrator.

According to this scan based discovery procedure, a plurality of subnet identifiers is considered. Nodes 110 in LAN 100 are discovered by trying to contact—through all agent device interfaces—all IP addresses (or a selected subpart) corresponding to such plurality of subnet identifiers (that is, by trying to contact all possible combinations of IP addresses obtainable with the subnet identifiers).

The plurality of subnet identifiers preferably includes the subnet identifiers associated with the interfaces of the agent device 120 and, preferably, also a plurality of subnet identifiers, corresponding to typical (preferably known a-priori) subnet identifiers set by default by different manufacturers/vendors. This last feature advantageously allows to extend the search to IP addresses, set by default by different manufacturers/vendors, which can belong to a subnet different from the ones covered by the agent device interfaces.

Figure 11:
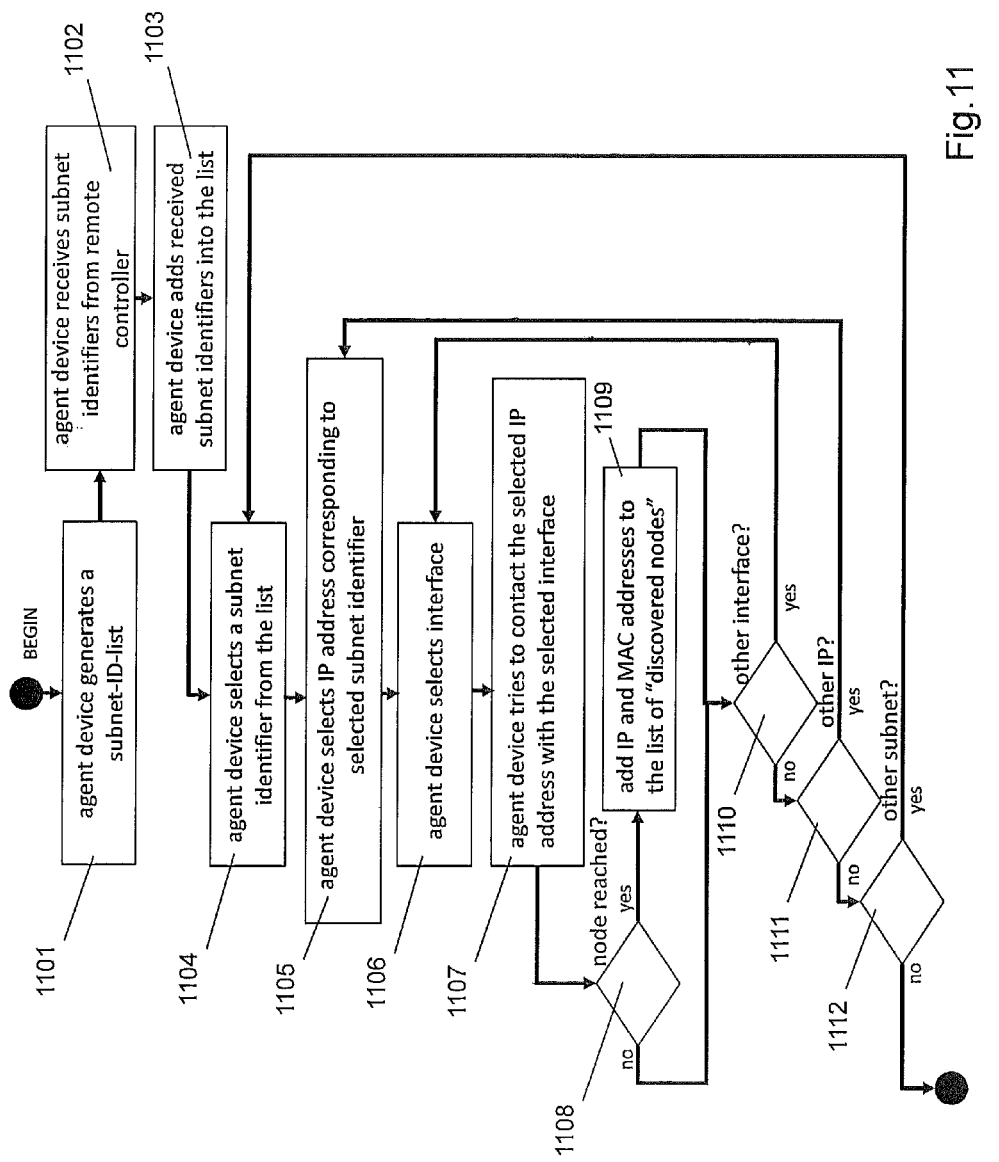
FIG. 11 shows a flowchart of an algorithm to implement a discovery procedure according to a fourth embodiment of the invention.

FIG. 11 shows an embodiment of scan based discovery procedure according to the invention.

At block 1101, the agent device 120 (under the control of remote controller 1) generates a subnet-ID-list and adds into said subnet-ID-list the identifiers of the subnets covered by the agent device interfaces.

At block 1102 the remote controller 1 sends to the agent device 120 a plurality of subnet identifiers, corresponding to typical (preferably known a-priori) subnet identifiers set by default by different manufacturers/vendors.

At block 1103, the agent device 120 adds them into the generated subnet-ID-list.

At block 1104, the agent device 120 (automatically or under the control of remote controller 1) selects from the generated subnet-ID-list a non-scanned subnet identifier.

At block 1105, the agent device 120 (automatically or under the control of remote controller 1) selects a non-scanned IP address from all possible IP addresses corresponding to the selected subnet identifier.

At block 1106, the agent device 120 (automatically or under the control of remote controller 1) selects an agent device interface that has not been tried yet with the selected IP address. Preferably, the selection can be performed such as to minimize the distance between the selected IP address and the identifier of the subnet corresponding to the interface.

At block 1107, the agent device 120 (automatically or under the control of remote controller 1) tries to contact the selected IP address through the selected interface. If required, the subnet conflict avoidance mechanism will be invoked, as detailed hereinafter.

At block 1108, the remote controller 1 (or agent device 120) checks if a node has been reached.

In the positive case, at block 1109, the remote controller 1 adds the IP and MAC addresses of the reached node in the first section 900 of database 14 in the "discovered nodes" list. Advantageously, the subnet and interface identifiers are also recorded. In fact, it can happen that a same IP address is reached through different interfaces, e.g. because different nodes connected to different interfaces are configured with identical, initial default IP address.

Anyhow, at block 1110, the remote controller 1 (or agent device 120) checks if there are other non-tried interfaces of agent device 120 for the selected IP address. In the positive, the procedure continues at block 1106. In the negative, at block 1111, the remote controller 1 (or agent device 120) checks if there are other non-scanned IP addresses for the selected subnet. In the positive, the procedure continues at block 1105. In the negative, at block 1112, the remote controller 1 (or agent device 120) checks if there are other non-scanned subnets. In the positive, the procedure continues at block 1104. In the negative, the procedure ends (that is, all IP addresses of all subnets have been tried through all interfaces of the agent device 120).

Advantageously, the scan based discovery procedure of FIG. 11 can be made more efficient if, before execution of the scan, at least one technique is used in order to check if it is possible to obtain couples of IP/MAC addresses for at least part of nodes 110 of LAN 100.

Examples of such techniques are:

use of broadcast ping according to ping utility well known in the art (as for example defined in RFC 792);

adopting IP sniffing techniques, or other passive scan techniques known in the art in order to monitor the traffic of the LAN and to discover the existence of nodes;

well-known device discovery protocols, such as UPnP (Universal Plug and Play, as for example described at the Internet website www.upnp.org), Bonjour (as for example described at the website http://developer.apple.com/opensource/), Zero-Configuration Networking (as, for example, defined by RFC 3927), or similar, that would allow the agent device 120 to receive specific messages sent by auto-declaring nodes, supporting themselves such protocols.

The use of such techniques advantageously allows to limit the scan procedure to IP addresses not retrieved through any of such techniques (the ones retrieved can be discovered by using the discovery procedure of FIG. 8) and to get to know about any IP address optionally included in the LAN 100 but not included in the subnet-ID-list generated at blocks 1101-1103.

An interesting feature of the invention is that the range of IP addresses the agent device 120 can access and detect can be configured in order to increase security level. This way the network administrator can decide which subset of nodes 110 is visible by the agent device 120 and, as a consequence, will be manageable through the remote controller 1. The address range can be specified in different well-known techniques, e.g. using whitelists or blacklist.

It is further observed that even if in the embodiment of FIG. 11 IP addresses are scanned considering—for each subnet identifier—all possible IP addresses corresponding to said subnet identifier and—for each IP address—all possible agent device interface, the scan can be carried out considering a different scanning sequence. For example, IP addresses can be scanned considering—for each agent device interface—the various subnet identifiers from the subnet-ID-list and—for each subnet identifier—all possible IP addresses corresponding to said subnet identifier.

In a LAN 100 where multiple generic vendor nodes are deployed with their default configuration, it is very likely that two or more nodes are initially associated with a same IP address, though having a different MAC address. This event draws to IP conflicts so that no one of those nodes can be properly reached via IP by the agent device 120, according to standard networking techniques.

For this reason, in a preferred embodiment, the invention provides a mechanism that allows the agent device 120 to exclude all nodes with the same IP address except one having a specified MAC address, and to contact it.

According to this mechanism, after a tunnel connection with remote controller 1 is established by agent device 120, any time the remote controller 1 needs to connect to a specific node of the LAN by using a specific IP address and MAC address, an IP conflict avoidance procedure is advantageously executed by the agent device 120 (automatically or under the control of remote controller 1) for guaranteeing connection to the specified IP address and MAC address even in case the specified IP addresses is associated with multiple MAC addresses.

Figure 12:
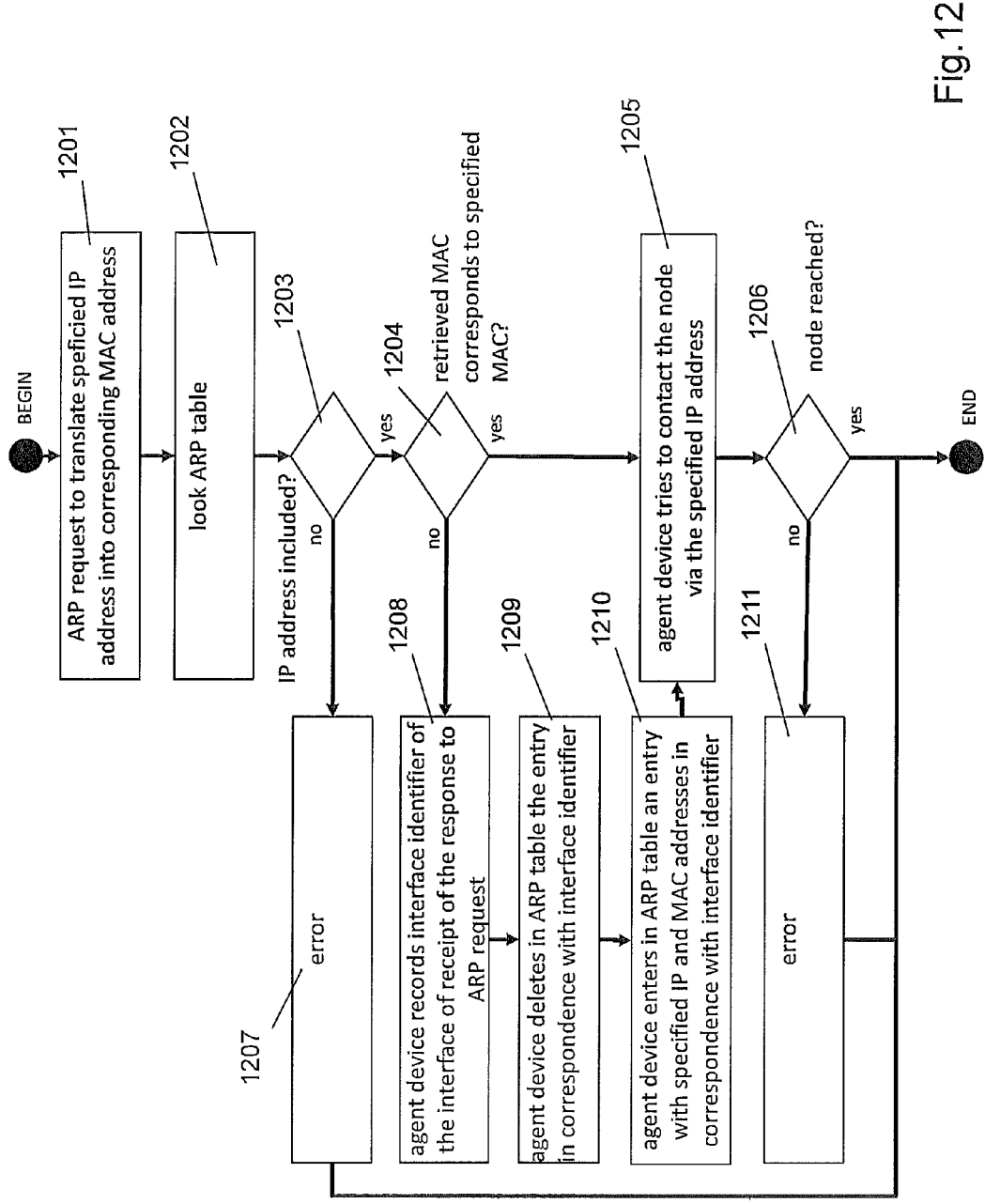
FIG. 12 shows a flowchart of an algorithm to implement an IP conflict avoidance procedure according to an embodiment of the invention.

FIG. 12 shows the IP conflict avoidance procedure according to an embodiment of the invention, wherein the agent device 120 supports the ARP protocol, including ARP table.

According to ARP protocol, the ARP table of the agent device will contain, for each agent device interface, entries represented by couples of IP/MAC addresses of nodes 110 of the LAN 100. These entries are updated each time the agent device sends ARP requests into the LAN 100. According to ARP protocol, the ARP able can contain only one entry for each IP address. Therefore, if more than one node reply to an ARP request, the ARP table is updated with a couple IP/MAC address corresponding to only one of the replying nodes (for example, the last node answering to the ARP request).

At block 1201 the agent device 120, needing to contact a specific node identified by a specified IP address and a specified MAC address, sends (automatically or under the control of remote controller 1) an ARP request for translating the specified IP address.

After sending the ARP request, at block 1102 the agent device 120 (automatically or under the control of remote controller 1) looks at its ARP table.

At block 1203, the agent device 120 (automatically or under the control of remote controller 1) checks if the ARP table includes the specified IP address.

In the positive case, at block 1204 the agent device 120 (automatically or under the control of remote controller 1) checks if the retrieved MAC address, i.e. the one associated in the ARP table with the specified IP address; is equal to the specified MAC address, i.e. the one that should be contacted.

In the positive case, at block 1205 the agent device (automatically or under the control of remote controller 1) tries to contact the node by using the specified IP address.

There is a variety of ways well known in the art the agent device 120 can use to connect to a specific device such as using a ping request or creating a TCP (Transmission Control Protocol) socket to the specified IP address, according to techniques well known in the art.

At block 1206 the agent device (automatically or under the control of remote controller 1) checks if the node has been reached. In the positive case, the procedure ends. In the negative case, at block 1211 a specific error is returned and the procedure ends.

In the negative case of block 1203 (that is, the ARP table does not include the specified IP address) a specific error is returned and the procedure ends.

In the negative case of block 1204 (that is the retrieved MAC address is not equal to the specified MAC address), at block 1208 the agent device 120 (automatically or under the control of remote controller 1) records the interface identifier through which it received the response to the ARP request.

At block 1209 the agent device 120 deletes in the ARP table the entry in correspondence with the recorded interface identifier that contains the specified IP address and the retrieved MAC address.

At block 1210 the agent device 120 adds into the ARP table, in correspondence with the recorded interface identifier, an ARP entry containing the specified IP address and the specified MAC address.

From block 1210 the procedure continues at block 1205.

The steps at blocks 1208 to 1210 allow the agent device to contact the node identified by the specific IP address and the specific MAC address, avoiding interference with other conflicting nodes having the same IP address but different MAC address.

A periodic use of the IP conflict avoidance procedure, also after the initial setup of LAN 100, advantageously allows the remote controller 1 to rise warning to the network administrator any time there is an IP conflict, e.g. generated by the connection of a new conflicting node to the LAN 100, in a moment successive to the initial setup.

According to a preferred embodiment (not shown), any time the IP conflict avoidance procedure avoids a conflict through execution of steps 1208 to 1210, the IP and MAC addresses of the conflicting nodes are added into the list of "discovered nodes" included in the first section 900 of database 14 of remote controller 1 (as explained, for examples, at blocks 803 and 806 of FIG. 8).

This allows the remote controller 1 to have knowledge of the IP conflicting nodes of the LAN 100 and to execute a mechanism for solving the IP conflicts and guaranteeing correct standard networking protocols operations.

The mechanism for solving the IP conflicts can be executed automatically by the remote controller 1 or under the control of the network administrator.

According to an embodiment, the conflict resolution mechanism can collect all MAC addresses of the conflicting nodes and assign to each one a specific IP address, in compliance with an addressing plan, using the IP conflict avoidance procedure as described above.

For example, if nodes AA:AA:AA:AA:AA:AA, BB:BB:BB:BB:BB:BB, CC:CC:CC:CC:CC:CC have the same IP address 192.168.0.1, the conflict resolution mechanism would:

contact IP address 192.168.0.1 applying the conflict avoidance procedure for forcing MAC address AA:AA:AA:AA:AA:AA, change IP address of device AA:AA:AA:AA:AA:AA from 192.168.0.1 to 192.168.0.101, contact IP address 192.168.0.1 applying conflict avoidance for forcing MAC address BB:BB:BB:BB:BB:BB, change IP address of device BB:BB:BB:BB:BB:BB from 192.168.0.1 to 192.168.0.102, contact IP address 192.168.0.1 applying conflict avoidance for forcing MAC address CC:CC:CC:CC:CC:CC change IP address of device CC:CC:CC:CC:CC:CC from 192.168.0.1 to 192.168.0.103

After this sequence, the three nodes are no longer in conflict.

When the agent device 120 has more than one interface, the network conflict resolution mechanism can use a subnet conflict avoidance mechanism (described hereinafter) to contact each node and will assign IP addresses that are consistent with each identifier of the subnets covered by the agent device interfaces.

It is observed that, when a node 110 of LAN 100 has an IP address that is not included in any subnet of the interfaces of the agent device 120 or that is the same of the agent device interface, that node would not be reachable by the agent device 120 according to standard networking techniques. For this reason, one aspect of the invention is the introduction of a subnet conflict avoidance procedure that forces the agent device 120 to contact a specific IP address through a specific interface.

Figure 13:
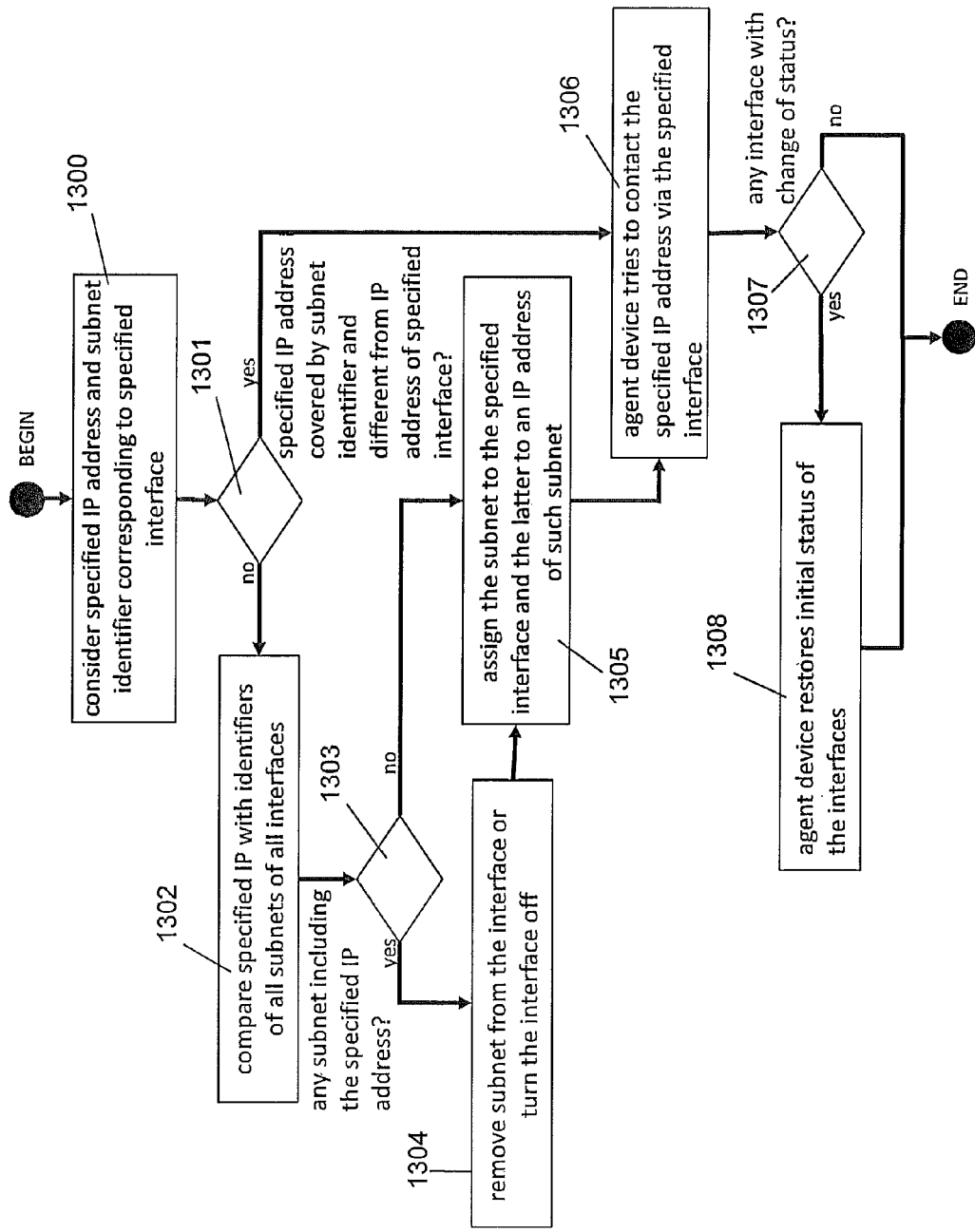
FIG. 13 shows a flowchart of an algorithm to implement a subnet conflict avoidance procedure according to an embodiment of the invention.

FIG. 13 shows an embodiment of subnet conflict avoidance procedure for contacting a specified IP address through a specified interface.

At block 1300 the agent device 120 (automatically or under the control of remote controller 1) considers the specified IP address, i.e. the one that it has to contact, and the identifier of the subnet corresponding to the specified interface, i.e. the interface through which it has to contact the specified IP.

At block 1301 the agent device 120 (automatically or under the control of remote controller 1) checks if the specified IP address is covered by the considered subnet identifier and if the IP address of the specified interface is different from the specified IP address.

In the negative case, at block 1302 the agent device 120 (automatically or under the control of remote controller 1) compares the specified IP with the identifiers of all the subnets of all the interfaces of the agent device 120.

At block 1303 the agent device 120 (automatically or under the control of remote controller 1) checks if there is any subnet including the specified IP address.

In the positive case, at block 1304, the agent device 120 (automatically or under the control of remote controller 1) removes the subnet from the interface to which the subnet is associated or turns such interface off. This step is useful to avoid the case of having two agent device interfaces with associated a same subnet.

Anyhow, at block 1305 the agent device 120 (automatically or under the control of remote controller 1) assigns the subnet corresponding to the specified IP address to the specified interface and assign to the specified interface an IP address of such subnet, which is different from the specified IP address. This assignment can be done according to techniques well known in the art.

At block 1306, the agent device 120 (automatically or under the control of remote controller 1) tries to contact the specified IP address through the specified interface.

When a MAC address is also specified, in case of IP conflict, the IP conflict avoidance procedure can be invoked at block 1306 in order to reach the node having both the specified IP address and the specified MAC address.

At block 1307 the agent device 120 (automatically or under the control of remote controller 1) checks if the status of any interface (that is, on/off, IP address, subnet) has been modified.

In the negative case the procedure ends.

In the positive case, at step 1308 the agent device 120 (automatically or under the control of remote controller 1) restores the initial status of the interfaces and the procedure ends.

It is observed that when the specified IP address corresponds to the IP address of the specified interface, actions at block 1305 will assign to the specified interface a temporarily different IP address. In this case, disconnections between the remote controller 1 and agent device 120 might occur, when the specified interface is the same as the one used for the remote controller 1-agent device 120 connection. If this happens, the agent device 120 will have to re-establish the connection with the remote controller 1. This can be done, for example, in two ways: 1) the agent device 120 keeps the new assigned IP address for the specified interface and re-establish a connection; 2) the agent device 120 continuously switches between the new assigned IP address and the specified IP address, for respectively contacting the node and the remote controller 1.

As stated above, the remote controller 1 implements a plurality of managing procedures (e.g. stored in section 930 of database 14) that allow to access, configure, control and monitor nodes of LAN 100 from different vendors and/or manufacturers. An advantageous aspect of this invention is the ability of the remote controller 1 to identify any node 110 of LAN 100 discovered through intermediation of agent device 120 and to associate to it a specific set of managing procedures, suitable to manage the specific node.

Accordingly, after executing a discovery procedure according to any of the embodiments described with reference to FIGS. 8 to 11, eventually using the IP conflict avoidance procedure and/or the subnet conflict avoidance procedure, the remote controller 1 identifies, through intermediation of the agent device 120, the discovered nodes.

Figure 14:
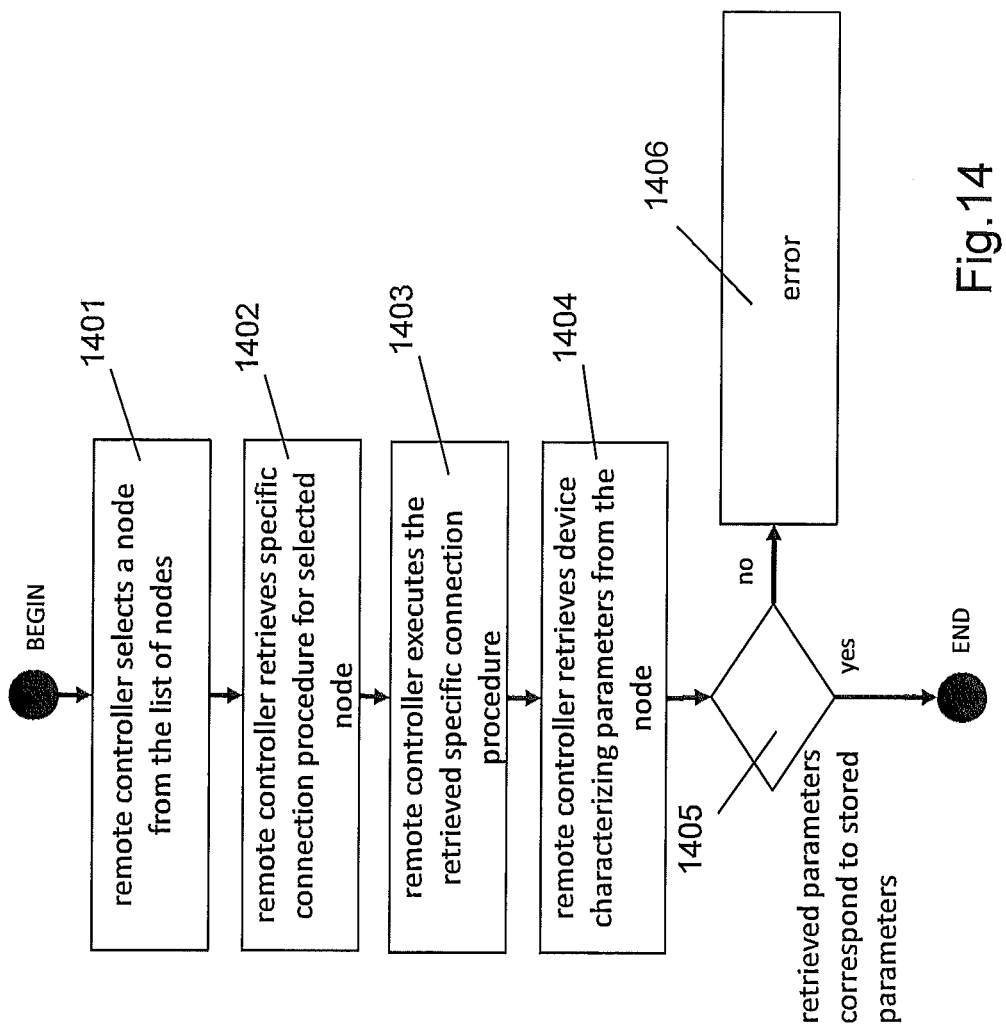
FIG. 14 shows a flowchart of an algorithm to implement an identification procedure according to a first embodiment of the invention.

FIG. 14 shows an identification procedure according to a first embodiment of the invention, based on the idea of having an a-priori knowledge, for each node 110 of LAN 100 (e.g. identified by its MAC address), of a corresponding connection procedure, enabling the remote controller 1 to properly connect, through intermediation of agent device 120, to such node 110.

This, for example, can be implemented by using the structure of database 14 of FIG. 4A, wherein there is a-priori configuration of the content of second section 910 (containing a list of nodes identifiers (e.g. MAC addresses) associated with device characterizing parameters such as model, vendor, manufacturer, software version, hardware version, firmware version and/or serial number) and fourth section 930 (comprising a plurality of managing procedures, each associated with specific device characterizing parameters such as model, vendor, manufacturer, software version, hardware version, firmware version and/or serial number).

At block 1401 of FIG. 14, the remote controller 1 selects a node 110 from the list of nodes contained in first section 900 of database 14 (as filled by the discovery procedure previously executed). Preferably, only the devices classified as "available" and, optionally, "discovered" are taken into account.

Then, at block 1402 the remote controller 1 retrieves the specific connection procedure required to access the selected node and to be authenticated by it, by using the node identifier (e.g. MAC address) and merging the information stored in second and fourth sections 910, 930 of database 14.

At block 1403, the remote controller 1 executes the retrieved connection procedure to be authenticated by the node.

Once authenticated, at block 1404, the remote controller 1 retrieves device characterizing parameters from the node.

At block 1405 the remote controller 1 checks if the retrieved parameters correspond to the device characterizing parameters stored in second section 910 of database 14.

In the positive case the procedure ends. In the negative case, at block 1406 an error is raised and the procedure ends.

An example of this procedure is reported for the sake of clarity:

first section 900 of the database 14 contains node identifiers, among which the MAC address AA:BB:CC:DD:EE:FF of the node that must be identified and configured;

third section 920 of the database 14 contains configuration parameters for this node, e.g. WEP KEY 1234567890 and IP ADDRESS 192.168.1.1; in order to be applied to the device, the correct vendor-model specific procedure must be used, thus the vendor, model and firmware version must be identified;

second section 910 contains a list of all supported MAC addresses with the related vendor, model and firmware information (information that can be available thanks to specific agreement with the specific vendors):

MAC AA:AA:AA:AA:AA:AA, associated to vendor US Robotics, model usr808054, firmware 1.0.2;

MAC AA:AA:AA:AA:AA:EE, associated to vendor US Robotics, model usr808054, firmware 4.0.1;

MAC AA:BB:CC:DD:EE:FF, associated to vendor Netgear, model WG103, firmware 3.1.

fourth section 930 contains a list of managing procedures to connect, configure and monitor specific models of nodes (this list can be expanded at runtime without generating service interruption, thus allowing to support virtually each firmware version of each model of each vendor/manufacturer):

ConnectionProcedureA, associated to vendor USRobotics, model usr808054, firmware 1.x and 2.x;

ConnectionProcedureB, associated to vendor USRobotics, model usr808054, firmware 4.x;

ConnectionProcedureC, associated to vendor Netgear, model WG101,WG102,WG103, firmware 3.1;

ConfigurationProcedureD, required to configure IP address of vendor USRobotics, model usr808054, firmware 4.x;

ConfigurationProcedureE, required to configure IP address of devices of vendor Netgear, model WG101,WG102, WG103, firmware 3.1;

ConfigurationProcedureF, required to configure WEP of devices of vendor Netgear, model WG101,WG102,WG103, firmware 3.1;

block 1401: the remote controller 1 selects from first section 900 the MAC identifier of the node that must be identified in terms of vendor/model, e.g. MAC address AA:BB:CC:DD:EE:FF;

block 1402: the remote controller 1 selects from second section 910 the information associated to AA:BB:CC:DD:EE:FF, i.e. vendor Netgear, model WG103, firmware 3.1;

block 1403: the remote controller 1 selects, from fourth section 930, the ConnectionProcedureC, as it corresponds to vendor Netgear, model WG103, firmware 3.1, and executes it to connect to the device;

block 1404: the remote controller 1 requests device parameters to the device (this request is considered to be part of the ConnectionProcedureC); if retrieved parameters correspond to vendor Netgear, model WG103, firmware 3.1, then the node is correctly identified (and its parameters, such as IP address and WEP key can be configured with, respectively, ConfigurationProcedureE and ConfigurationProcedureF).

FIG. 15 shows an identification procedure according to a second embodiment of the invention. This procedure is based on a structure of database 14 according to the embodiment of FIG. 4B and on an a-posteriori knowledge of the content of second section 910 of database 14 (containing a list of nodes identifiers (e.g. MAC addresses) associated with device characterizing parameters such as model, vendor, manufacturer, software version, hardware version, firmware version, serial number and similar). Indeed, second section 910 is filled and updated during the execution of this identification procedure.

At block 1501 the remote controller 1 selects a node 110 from the list of nodes contained in first section 900 of database 14 (as filled by the discovery procedure previously executed). Preferably, only the devices classified as "available" and, optionally, "discovered" are taken into account.

Then, at block 1502 the remote controller 1 checks if there is a specific connection procedure for the selected node, by using the node identifier (e.g. MAC address) and merging the information stored in second and fourth sections 910, 930 of database 14.

In the positive case, blocks 1503 to 1506 are executed, which correspond to blocks 1402 to 1405 of FIG. 14.

In the positive case of block 1506, the procedure ends.

In the negative case, at block 1507 the remote controller removes from the second section 910 the association between the MAC address and the corresponding device parameters, and the procedure continues at block 1502. This feature is advantageous to reveal different firmware versions of a specific node model.

In the negative case of block 1502, the remote controller 1 selects from fifth section 911 a sequence of connection procedures that is supposed to include a correct procedure for the specific, even if not characterized, node. This choice is done at block 1508, according to a predetermined selection criterion. Advantageously, the selection criterion aims at minimizing the number of connection procedures to be tested before successfully connecting to the node 110. For example, the selection criterion for a connection procedure can be the average time for the connection procedure to be successful, the difference between the MAC address of the selected node and the MAC address of nodes which have already been successfully associated with the connection procedure, or being part of a list of procedures associated with a predetermined vendor that has been specified by the network administrator as vendor for the node(s) 110. Advantageously, the list of sequences stored in section 911 includes a default sequence that contains all the connection procedures available in the database, section 930, even if this solution wouldn't be optimized.

At block 1509, the remote controller 1 tries the connection procedures of the selected sequence.

At block 1510 the remote controller 1 checks if at least one connection procedure is successful.

In the positive case, the node 110 is considered characterized and at block 1512 its identifier (e.g. the MAC address) is inserted into the second section 910 of database 14, associated with the device characterizing parameters retrieved from the node itself during the connection procedure.

In the negative case of block 1510, at block 1511 the remote controller 1 records a warning containing all the details of the unsupported device.

An example of this second embodiment is reported for the sake clarity:

first section 900 of the database 14 contains the node identifiers, among which the MAC address AA:BB:CC:DD:EE:FF of the node that must be identified and configured;

third section 920 of the database 14 contains the configuration parameters, e.g. WEP KEY 1234567890 and IP ADDRESS 192.168.1.1;

second section 910 of database 14 is empty, as per each MAC address specified by the user, no device parameters (vendor,model, firmware version) are available;

fourth section 930 of database 14 contains procedures to connect, configure and monitor specific models of access points:

ConnectionProcedureA, associated to vendor USRobotics, model usr808054, firmware 1.x and 2.x;

ConnectionProcedureB, associated to vendor USRobotics, model usr808054, firmware 4.x;

ConnectionProcedureC, associated to vendor Netgear, model WG101,WG102,WG103, firmware 3.1;

ConnectionProcedureD, associated to vendor Netgear, model WG001,WG002,SK999, firmware 2;

ConfigurationProcedureE, required to configure IP address of vendor USRobotics, model usr808054, firmware 4.x;

ConfigurationProcedureF, required to configure IP address of devices of vendor Netgear, model WG101,WG102, WG103, firmware 3.1;

ConfigurationProcedureG, required to configure WEP of devices of vendor Netgear, model WG101,WG102,WG103, firmware 3.1;

section 911 of database 14 contains different sequences of connection procedures:

Sequence1: ConnectionProcedureA, ConnectionProcedureB;

Sequence2: ConnectionProcedureD, ConnectionProcedureC;

Sequence3: ConnectionProcedureA, ConnectionProcedureB, ConnectionProcedureC, containing all connection procedures;

Each sequence is also characterized by metric parameters, e.g. the number of times it has been executed, the number of connection established and refused, the average number of connection procedure tried before success per each MAC address range, and similar. As this latter is a measure of the ability of the sequence itself to connect to a device whose MAC lies in a specific range, and as known by those skilled in the art each MAC range is associated to a specific vendor, this metric can measure the ability of a sequence to connect to a specific vendor but unknown model.

block 1501: the remote controller 1 selects from section 900 the MAC identifier of the node that must be identified in terms of vendor/model, e.g. AA:BB:CC:DD:EE:FF;

block 1508: the remote controller 1 selects a sequence from section 911, in order to minimize some metric. If this metric is the average number of connection procedures tried before success, as detailed above, Sequence2 would be chosen: it contains procedures that succeed with MAC addresses that lie in the Netgear range, as MAC AA:BB:CC:DD:EE:FF does;

block 1509: the multi-vendor controller selects, from section 930, the
ConnectionProcedureD, as it corresponds to the first connection procedure of the chosen sequence (Sequence2); ConnetionProcedureD fails, as it is related to a model that is different from the device whose MAC is AA:BB:CC:DD:EE: FF; then the remote controller 1 selects, from section 930, the second procedure of Sequence2, which is ConnectionProcedureC, and executes it; as the device vendor/model/version correspond to the ones supported by ConnectionProcedureC, the procedure succeeds and device AA:BB:CC:DD:EE:FF characterization is retrieved: vendor Netgear, model WG103, firmware 3.1;

block 1512: as ConnectionProcedureC succeeded, the multi-vendor controller can associate to the device MAC AA:BB:CC:DD:EE:FF vendor Netgear, model WG103, firmware 3.1, in section 910 of the database;

after this procedure, the remote controller 1 will be able to identify AA:BB:CC:DD:EE:FF device following the a-priori steps: 1503 to 1505.

Advantageously, the identifying procedure of FIG. 15 can be made more efficient if, before execution of the procedure, at least one of the techniques mentioned above with reference to the scan discovery procedure (e.g., UPnP, Bonjour, Zero-Configuration Networking) is used in order to check if it is possible to obtain couples of IP/MAC addresses together with some device characterizing parameters (e.g. vendor) for at least part of nodes 110 of LAN 100.

This would allow the remote controller 1 (or agent device 120) to have a-priori knowledge of some device parameters that can be used at block 1508 in order to optimize the selection of an appropriate sequence of connection procedures.

After executing a discovery procedure according to any of the embodiments described with reference to FIGS. 8 to 11, and an identification procedure according to any of embodiments described with reference to FIGS. 14 and 15, the remote controller 1 is ready to be used by the network administrator for executing managing operations on nodes 110. These operations can be applied by the network administrator to single nodes 110, to a subset of the nodes 110 of LAN 100, or to all nodes 110 of the LAN 100. In any case, the network administrator can execute these operations through the remote controller user interface 18. When the network administrator wishes to manage a node 110, the following procedure can be executed:

network administrator starts the remote controller user interface 18 (e.g., web site, tablet application, etc.);

network administrator provides authentication parameters;

network administrator selects the node he/she wishes to manage, among the "available nodes" list (box 901 of first section 900 of database 14, shown in FIG. 5A) provided by the remote controller 1;

network administrator changes one or more configuration parameters of the selected node (e.g. the IP address and/or the SSID);

remote controller 1 saves the new configuration parameters into the database 14 (third section 920 shown in FIG. 4), in association with the selected node;

network administrator confirms the new configuration;

by using the information contained in sections 910 and 930 of database 14, remote controller 1, selects the specific vendor/model configuration procedure to be used to configure the selected node;

remote controller 1 executes the specific vendor/model configuration procedure to configure the node and, when the execution is completed, returns a confirmation to the network administrator.

A similar sequence can be executed in case of monitoring operations.

As clear from the above description, the invention in the various aspects thereof allows to achieve a plurality of advantages.

A crucial innovation of the proposed invention is the fact that it is not required to deploy any software onto the nodes 110 to be managed, or assume any specific procedure or behavior, in order to make them manageable by the remote controller 1. This is possible thanks to the intermediation of the agent device 120, which initiates contact with the remote controller 1 and establish a tunnel connection with it, and to the discovery and identification procedures that enable the remote controller to discover which nodes 110 are present in LAN 100 and to identify the device characterizing parameters (such as manufacturer/vendor, type, model, hardware version, firmware version, software version, serial number, MAC address and similar) of such nodes, that enable the remote controller 1 to manage each device by using specific known vendor/manufactures procedures and protocols.

Proprietary available interfaces known in the art, such as HTTP, HTTPS, CLI, SSH, configuration files, which are differently supported and implemented by different vendors/manufactures, can thus be used by the remote controller 1 in order to connect, control, configure and monitor the nodes, even when the nodes are not manufactured to be centrally managed, without the need of modifying the software/firmware of such nodes, or requiring any specific behavior of the nodes other than standard or proprietary exposed interfaces.

Any node, coming from a generic vendor/manufacturer, included a low-cost consumer-grade network device, can be managed by the remote management system of the invention.

It is further observed that a challenging aspect of using nodes coming from a generic vendor/manufacturer is that they typically come from the factory with a common built-in IP address. This means that any time a new node is inserted into the LAN, conflicts of IP addresses are very likely to arise.

Thanks to the IP conflict avoidance procedure and the subnet conflict avoidance procedure of the invention, IP-addresses conflicts can be centrally managed by the remote controller 1, without the need of deploying any specific software onto the nodes 110 to be managed or assuming any specific procedure or behavior for the nodes.

A central management of IP-addresses conflicts also guarantees that specific policies established by the network administrator are met.

This is advantageous with respect to known solutions for IP-conflicts wherein the nodes need to be configured to execute auto-assignment algorithms (such as for example the MAC-to-IP association algorithm described by U.S. Pat. No. 7,852,819) and the auto-assigned IP addresses might be not compatible with network policies established by the network administrator.

The invention claimed is:

1. A method of remote management in a network, the network comprising a plurality of nodes to be managed by a remote controller and at least one agent device, the at least one agent device being in number lower than the plurality of nodes, wherein:

the at least one agent device makes initial contact with the remote controller in order to be authenticated by the remote controller and to establish a connection with the remote controller;

after the connection is established, the remote controller executes a discovery procedure through intermediation of the at least one agent device for discovering the plurality of nodes;

after executing the discovery procedure, the remote controller executes an identification procedure through intermediation of the at least one agent device for identifying the discovered nodes, including identification of at least one characterizing parameter selected from: a model, vendor, a manufacturer, a software version, a hardware version, a firmware version, a serial number and a MAC address, wherein in the identification procedure the remote controller:

selects a specific node from the discovered nodes;

retrieves from a database of the remote controller a specific connection procedure for connection to the specific node;

uses the retrieved specific connection procedure for connecting to the specific node, through the intermediation of the at least one agent device, and for obtaining from the specific node said at least one characterizing parameter;

the remote controller manages the discovered and identified nodes through intermediation of the at least one agent device, by retrieving from a database managing procedures specific for each identified node.

2. The method according to claim 1, wherein the connection established with the remote controller is a tunnel connection.

3. The method according to claim 2, wherein the tunnel connection is established by the at least one agent device according to a tunnelling procedure including the step of trying in sequence a predetermined plurality of tunnelling protocols for establishing tunnel connection with the remote controller till a tunnel connection is successfully established.

4. The method according to claim 3, wherein the predetermined plurality of tunnelling protocols are tried in sequence following a selection criterion adapted to minimize resources required on at least one of the at least one agent device or the remote controller in order to execute the tunnelling protocols.

5. The method according to claim 1, wherein the discovery procedure includes trying to establish a connection with the plurality of nodes, through intermediation of the at least one agent device, by using at least one of a predetermined IP address or a MAC address, or by using a scanning procedure scanning a predetermined multitude of IP addresses.

6. The method according to claim 5, wherein the predetermined multitude of IP addresses comprises at least one of IP addresses included in at least one subnet corresponding to at least one interface of at least one of the at least one agent device, or generic IP addresses corresponding to IP addresses set by default by at least one of a predetermined manufacturers or vendors.

7. The method according to claim 5, wherein when the at least one agent device comprises more than one interface, the scanning procedure is executed for each interface.

8. The method according to claim 1, wherein when the database does not include a specific connection procedure associated with the specific node, the identification procedure includes trying in sequence a plurality of connection procedures for connecting to the specific node till connection is successfully established, the plurality of connection procedures being selected in sequence according to a predetermined selection criterion.

9. The method according to claim 1, wherein, when a connection to a specific node with a specified IP address and MAC address has to be established, and in case of IP address conflict between the specific node and at least one other node of the plurality of nodes, the at least one agent device executes an IP conflict avoidance procedure making use of ARP protocol and ARP table, the IP conflict avoidance procedure comprising:
   i. sending into the network a request according to ARP protocol in order to translate the specified IP address into a MAC address;
   ii. after executing i., checking if the ARP table includes the specified IP address;
   iii. in the positive case of ii., checking if the specified IP address is associated in the ARP table with the specified MAC address;
   iv. in the positive case of iii., trying to establish a connection with the specific node by using the specified IP address;
   v. in the negative case of iii., modifying the ARP table so as to associate the specified IP address with the specified MAC address, then trying to establish a connection with the specific node by using the specified IP address.

10. The method according to claim 1, wherein, when a connection to a specified IP address through a specified interface of the at least one agent device has to be established, and in at least one of the case of an IP address conflict between the specified IP address and the IP address of the specified interface, or the case that the specified IP address is not included in a subnet corresponding to the specified interface, the at least one agent device executes a subnet conflict avoidance procedure comprising:
   I. checking if the specified IP address is included in the subnet corresponding to the specified interface and if the specified IP address is different from the IP address of the specified interface,
   II. in the affirmative case of I., the at least one agent device tries to establish a connection by using the specified IP address,
   III. in the negative case of I., the at least one agent devices temporally assigns to the specified interface both a subnet including the specified IP address and an IP address included is said subnet, which is different from the specified IP address.

11. The method according to claim 10, wherein, when the at least one agent device comprises a plurality of interfaces, step III also comprises a step of temporarily making out of use any other interface of the plurality of interfaces, other than the specified interface, which corresponds to a subnet including the specified IP address.

12. Method of remote management in a network, the network comprising a plurality of nodes to be managed by a remote controller and at least one agent device, the at least one agent device being in number lower than the plurality of nodes, wherein:
   the at least one agent device makes initial contact with the remote controller in order to be authenticated by the remote controller and to establish a tunnel connection with the remote controller;
   after the connection is established, the remote controller executes a discovery procedure through intermediation of the at least one agent device for discovering the plurality of nodes;
   after executing the discovery procedure, the remote controller executes an identification procedure through intermediation of the at least one agent device for identifying the discovered nodes, including identification of at least one characterizing parameter selected from: model, vendor, manufacturer, software version, hardware version, firmware version, serial number and MAC address;
   the remote controller manages the discovered and identified nodes through intermediation of the at least one agent device, by using managing procedures specific for the identified nodes,
   wherein the tunnel connection is established by the at least one agent device according to a tunnelling procedure including the step of trying in sequence a predetermined plurality of tunnelling protocols for establishing tunnel connection with the remote controller till a tunnel connection is successfully established.

13. The method according to claim 12, wherein the predetermined plurality of tunnelling protocols are tried in sequence following a selection criterion adapted to minimize resources required on at least one of the at least one agent device or the remote controller in order to execute the tunnelling protocols.

14. Method of remote management in a network, the network comprising a plurality of nodes to be managed by a remote controller and at least one agent device, the at least one agent device being in number lower than the plurality of nodes, wherein:
   the at least one agent device makes initial contact with the remote controller in order to be authenticated by the remote controller and to establish a connection with the remote controller;
   after the connection is established, the remote controller executes a discovery procedure through intermediation of the at least one agent device for discovering the plurality of nodes;
   after executing the discovery procedure, the remote controller executes an identification procedure through intermediation of the at least one agent device for identifying the discovered nodes, including identification of at least one characterizing parameter selected from: model, vendor, manufacturer, software version, hardware version, firmware version, serial number and MAC address;
   the remote controller manages the discovered and identified nodes through intermediation of the at least one agent device, by using managing procedures specific for the identified nodes,
   wherein, when a connection to a specific node, among said plurality of nodes, with a specified IP address and MAC address has to be established, and in case of IP address conflict between the specific node and at least one other node of the plurality of nodes, the at least one agent device executes an IP conflict avoidance procedure making use of ARP protocol and ARP table, the IP conflict avoidance procedure comprising:

i. sending into the network a request according to ARP protocol in order to translate the specified IP address into a MAC address;
ii. after executing i., checking if the ARP table includes the specified IP address;
iii. in the positive case of ii., checking if the specified IP address is associated in the ARP table with the specified MAC address;
iv. in the positive case of iii., trying to establish a connection with the specific node by using the specified IP address;
v. in the negative case of iii., modifying the ARP table so as to associate the specified IP address with the specified MAC address, then trying to establish a connection with the specific node by using the specified IP address.

15. The method according to claim 14, wherein, when a connection to a specified IP address through a specified interface of the at least one agent device has to be established, and in at least one of the case of IP address conflict between the specified IP address and the IP address of the specified interface, or the case that the specified IP address is not included in a subnet corresponding to the specified interface, the at least one agent device executes a subnet conflict avoidance procedure comprising:
   I. checking if the specified IP address is included in the subnet corresponding to the specified interface and if the specified IP address is different from the IP address of the specified interface,
   II. in the affirmative case of I., the at least one agent device tries to establish a connection by using the specified IP address,
   III. in the negative case of I., the at least one agent devices temporally assigns to the specified interface both a subnet including the specified IP address and an IP address included is said subnet, which is different from the specified IP address.

16. The method according to claim 15, wherein, when the at least one agent device comprises a plurality of interfaces, step III also comprises a step of temporarily making out of use any other interface of the plurality of interfaces, other than the specified interface, which corresponds to a subnet including the specified IP address.

17. Method of remote management in a network, the network comprising a plurality of nodes to be managed by a remote controller and at least one agent device, the at least one agent device being in number lower than the plurality of nodes, wherein:
   the at least one agent device makes initial contact with the remote controller in order to be authenticated by the remote controller and to establish a connection with the remote controller;
   after the connection is established, the remote controller executes a discovery procedure through intermediation of the at least one agent device for discovering the plurality of nodes;
   after executing the discovery procedure, the remote controller executes an identification procedure through intermediation of the at least one agent device for identifying the discovered nodes, including identification of at least one characterizing parameter selected from: model, vendor, manufacturer, software version, hardware version, firmware version, serial number and MAC address;
   the remote controller manages the discovered and identified nodes through intermediation of the at least one agent device, by using managing procedures specific for the identified nodes.

18. The method according to claim 17, wherein the discovery procedure include trying to establish a connection with the plurality of nodes, through intermediation of the at least one agent device, by using at least one of a predetermined IP address or a MAC address, or by using a scanning procedure scanning a predetermined multitude of IP addresses.

19. The method according to claim 18, wherein the predetermined multitude of IP addresses comprises at least one of IP addresses included in at least one subnet corresponding to at least one of an interface of the at least one agent device, or a generic IP addresses corresponding to IP addresses set by default by at least one of a predetermined manufacturer or a vendor.

20. The method according to claim 18, wherein when the at least one agent device comprises more than one interface, the scanning procedure is executed for each interface.

21. A remote managing system comprising a remote controller and a network, the network comprising a plurality of nodes to be managed by the remote controller and at least one agent device, the at least one agent device being in number lower than the plurality of nodes, wherein the remote controller and the at least one agent device are configured such that:
   the at least one agent device makes initial contact with the remote controller in order to be authenticated by the remote controller and to establish a connection with the remote controller;
   after the connection is established, the remote controller executes a discovery procedure through intermediation of the at least one agent device for discovering the plurality of nodes;
   after executing the discovery procedure, the remote controller executes an identification procedure through intermediation of the at least one agent device for identifying the discovered nodes, including identification of at least one characterizing parameter selected from: a model, vendor, a manufacturer, a software version, a hardware version, a firmware version, a serial number and a MAC address, wherein in the identification procedure the remote controller:
   selects a specific node from the discovered nodes;
   retrieves from a database of the remote controller a specific connection procedure for connection to the specific node;
   uses the retrieved specific connection procedure for connecting to the specific node, through the intermediation of the at least one agent device, and for obtaining from the specific node said at least one characterizing parameter;
   the remote controller manages the discovered and identified nodes through intermediation of the at least one agent device, by retrieving from a database managing procedures specific for each identified node.

* * * * *